(12) United States Patent
Garelli et al.

(10) Patent No.: US 8,638,549 B2
(45) Date of Patent: Jan. 28, 2014

(54) ELECTRONIC DEVICE DISPLAY MODULE

(75) Inventors: Adam T. Garelli, Santa Clara, CA (US); Dinesh C. Mathew, Fremont, CA (US); Thomas W. Wilson, Jr., Saratoga, CA (US); Keith J. Hendren, Capitola, CA (US); Peteris K. Augenbergs, San Francisco, CA (US); Brett W. Degner, Menlo Park, CA (US); Bradley J. Hamel, Sunnyvale, CA (US); Michael A. Damlanakis, San Francisco, CA (US); Patrick Kessler, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 12/862,748

(22) Filed: Aug. 24, 2010

(65) Prior Publication Data

US 2012/0050975 A1 Mar. 1, 2012

(51) Int. Cl.
*H05K 5/00* (2006.01)
*H05K 7/00* (2006.01)
*G06F 1/16* (2006.01)

(52) U.S. Cl.
USPC ............ 361/679.27; 361/679.26; 361/679.55

(58) Field of Classification Search
USPC .................... 361/679.02, 679.21, 679.55, 361/679.26–679.3, 679.56
See application file for complete search history.

(56) References Cited

U.S. PATENT DOCUMENTS

| | | | |
|---|---|---|---|
| 2,964,887 A | 12/1960 | Orozco | |
| 3,517,466 A | 6/1970 | Bouvier | |
| 4,766,746 A | 8/1988 | Henderson et al. | |
| 5,237,486 A | 8/1993 | LaPointe et al. | |
| 5,531,950 A | 7/1996 | Kimura et al. | |
| 5,606,438 A | 2/1997 | Margalit et al. | |
| 5,611,517 A | 3/1997 | Saadi et al. | |
| 5,795,430 A | 8/1998 | Beeteson et al. | |
| 5,828,341 A | 10/1998 | Delamater | |
| 5,881,103 A | 3/1999 | Wong et al. | |

(Continued)

FOREIGN PATENT DOCUMENTS

| | | |
|---|---|---|
| EP | 0683026 | 3/2001 |
| EP | 0911717 | 3/2003 |

(Continued)

OTHER PUBLICATIONS

Mathew et al., U.S. Appl. No. 12/483,205, filed Jun. 11, 2009.

(Continued)

*Primary Examiner* — Anthony Haughton
(74) *Attorney, Agent, or Firm* — Treyz Law Group; G. Victor Treyz; Jennifer Luh

(57) ABSTRACT

Electronic devices may have housings. A housing may contain a display on its front face and a rear plate such as a plate formed from glass on its rear face. A peripheral housing member may surround the display and rear plate. An antenna may be formed in the peripheral housing member. The rear plate may be formed from laminated layers including a light guide layer. Device hinges may include hinge structures that are integral to the peripheral housing member. A logo may be formed by coating the rear plate with a patterned masking layer. Display structures for the display and the rear plate may be mounted to opposing sides of a shelf portion of the peripheral housing member. The rear plate may be formed from electrochromic glass and may cover photovoltaic cells and touch sensors. Driver boards may be mounted within a clutch barrel perpendicular to the display.

17 Claims, 26 Drawing Sheets

(56) References Cited

U.S. PATENT DOCUMENTS

| | | | |
|---|---|---|---|
| 6,014,080 | A | 1/2000 | Layson, Jr. |
| 6,046,401 | A | 4/2000 | McCabe |
| 6,122,167 | A | 9/2000 | Smith et al. |
| 6,151,012 | A | 11/2000 | Bullister |
| 6,179,122 | B1 | 1/2001 | Moncrief et al. |
| 6,416,844 | B1 | 7/2002 | Robson |
| 6,494,593 | B2 | 12/2002 | An et al. |
| 6,532,152 | B1 * | 3/2003 | White et al. ............... 361/692 |
| 6,542,384 | B1 | 4/2003 | Radu et al. |
| 6,547,420 | B2 | 4/2003 | Li |
| 6,677,918 | B2 | 1/2004 | Yuhara et al. |
| 6,791,465 | B2 | 9/2004 | Blagin et al. |
| 6,825,894 | B2 | 11/2004 | Aoyagi et al. |
| 6,846,228 | B2 | 1/2005 | Lin |
| 6,853,336 | B2 | 2/2005 | Asano et al. |
| 6,874,903 | B2 | 4/2005 | Yang et al. |
| 6,876,543 | B2 | 4/2005 | Mockridge et al. |
| 6,967,833 | B2 | 11/2005 | Boykin et al. |
| 6,992,733 | B1 | 1/2006 | Klein |
| 6,999,826 | B1 | 2/2006 | Zhou et al. |
| 7,030,893 | B2 | 4/2006 | Yang |
| 7,055,215 | B1 | 6/2006 | Ligtenberg et al. |
| 7,330,122 | B2 | 2/2008 | Derrick et al. |
| 7,342,792 | B2 | 3/2008 | Kim et al. |
| 7,369,191 | B2 | 5/2008 | Okamoto et al. |
| 7,420,798 | B2 * | 9/2008 | Takahashi ............... 361/679.27 |
| 7,452,098 | B2 | 11/2008 | Kerr |
| 7,522,889 | B2 | 4/2009 | Wulff et al. |
| 7,535,547 | B2 | 5/2009 | Tannas, Jr. |
| 7,545,574 | B2 | 6/2009 | Park et al. |
| 7,583,353 | B2 | 9/2009 | Kujiraoka |
| 7,824,078 | B2 | 11/2010 | Peng et al. |
| 7,933,123 | B2 * | 4/2011 | Wang et al. ............... 361/679.56 |
| 7,937,865 | B2 | 5/2011 | Li et al. |
| 8,081,430 | B2 | 12/2011 | Weber et al. |
| 2002/0037686 | A1 | 3/2002 | Brown et al. |
| 2002/0048148 | A1 | 4/2002 | Horiuchi et al. |
| 2003/0197111 | A1 | 10/2003 | Morimoto et al. |
| 2004/0090742 | A1 * | 5/2004 | Son et al. ............... 361/686 |
| 2005/0069667 | A1 | 3/2005 | Wacker |
| 2006/0082956 | A1 | 4/2006 | Garel et al. |
| 2006/0268528 | A1 | 11/2006 | Zadesky et al. |
| 2007/0070591 | A1 | 3/2007 | Sheng et al. |
| 2007/0165373 | A1 | 7/2007 | Merz et al. |
| 2008/0024470 | A1 * | 1/2008 | Andre et al. ............... 345/204 |
| 2008/0026614 | A1 | 1/2008 | Emerson et al. |
| 2008/0062148 | A1 | 3/2008 | Hotelling et al. |
| 2008/0062625 | A1 | 3/2008 | Batio |
| 2008/0237477 | A1 | 10/2008 | Hoggatt et al. |
| 2009/0088055 | A1 | 4/2009 | Silva et al. |
| 2009/0146279 | A1 | 6/2009 | Griffin |
| 2009/0175001 | A1 | 7/2009 | Mathew et al. |
| 2009/0183819 | A1 | 7/2009 | Matsuhira |
| 2009/0256520 | A1 | 10/2009 | Frishman |
| 2009/0322193 | A1 * | 12/2009 | Yamaguchi ............... 312/223.2 |
| 2010/0059295 | A1 | 3/2010 | Hotelling et al. |
| 2010/0073241 | A1 | 3/2010 | Vazquez et al. |
| 2010/0073243 | A1 * | 3/2010 | Ayala Vazquez et al. ..... 343/702 |
| 2010/0103641 | A1 | 4/2010 | Cho et al. |
| 2010/0156794 | A1 | 6/2010 | Sauer et al. |

FOREIGN PATENT DOCUMENTS

| | | |
|---|---|---|
| EP | 1621967 | 2/2006 |
| JP | 05011717 | 1/1993 |
| JP | 2003174492 | 6/2003 |
| WO | 2009126480 | 10/2009 |

OTHER PUBLICATIONS

Mathew et al., U.S. Appl. No. 12/483,206, filed Jun. 11, 2009.
Mathew et al., U.S. Appl. No. 12/691,714, filed Jan. 21, 2010.
Mathew et al., U.S. Appl. No. 12/691,715, filed Jan. 21, 2010.
Springer et al., U.S. Appl. No. 12/486,486, filed Jun. 17, 2009.
Kough et al., U.S. Appl. No. 12/490,286, filed Jun. 23, 2009.
Block, "MacBook Air Review", Engadget, Jan. 25, 2008, [Retrieved Nov. 19, 2012]. Retrieved from the Internet: <URL: http://engadget.com/2008/01/25/Macbook-air-review>.
PowerBook G4 (15-Inch FW 800): Sound Specifications, Apple.com, Jan. 8, 2007, [Retrieved Nov. 19, 2012]. Retrieved from the Internet: <URL: http://support.apple.com/kb/TA27151?viewlocale=en_US>.
Bergeron et al., U.S. Appl. No. 12/580,886, filed Oct. 16, 2009.
Bergeron et al., U.S. Appl. No. 13/540,521, filed Jul. 2, 2012.

* cited by examiner

ELECTRONIC DEVICE DISPLAY MODULE

BACKGROUND

This relates to electronic devices such as computers, and more particularly, to displays and display-based features for computers.

Computers such as portable computers are often provided with liquid crystal displays. Portable computers typically have upper and lower housings that are connected by a hinge. The lower housing contains computer keys and a pointing device such as a track pad. The upper housing contains a display. The hinge allows the upper housing to be opened when the computer is in use and to be closed when it is desired to protect the keys and other components of the lower housing.

Typical housing materials for computers include plastic and metal. The display is generally a liquid crystal display (LCD). Components that are associated with the display such as a light reflector layer and backlight may be mounted inside the upper housing. The plastic or metal of the upper housing forms an enclosure that protects the rear surface of the display and the other components from damage. An opening in formed in the front of the upper housing to allow the user of the computer to view images on the display.

Conventional computers such as these are sometimes bulkier and less aesthetically appealing than desired and may lack desirable user interface features. For example, the housing of the computer may be thicker and less attractive than desired and may be devoid of capabilities that would make the computer more appealing to use.

It would therefore be desirable to provide improved computers such as computers with improved housing and display features.

SUMMARY

Electronic devices such as portable computers may be provided. The electronic devices may have housings such as upper and lower housings that are connected by hinges. The hinges may allow the upper housing to rotate relative to the lower housing.

The upper housing may contain a display on its front face. A rear plate may be formed on the rear face of the upper housing. The lower housing may have a front plate on its front surface and a rear plate on its rear surface.

A peripheral housing member may surround the display and rear plate in the upper housing. A peripheral housing member may surround the front and rear plates in the lower housing. The peripheral housing members may each be formed from a metal or other materials. An antenna may be formed in an opening in a peripheral housing member or may be mounted adjacent to a peripheral housing member. During operation, antenna signals may pass through dielectric layers associated with a liquid crystal display on the front of the upper housing and may pass in the opposite direction through the rear plate in the upper housing. The hinges that connect the upper and lower housings may include hinge structures that are integral to the peripheral housing member.

The front and rear plates may each be formed from a material such as glass, ceramic, metal, fiber composites, or plastic. When formed from a material such as glass, the rear plate may be transparent and may allow light to pass through the rear of the housing. The light may be used to illuminate a logo. A patterned masking layer on the rear plate may be used to define the shape of the illuminated logo. Light for illuminating the logo may be light that passes through a light reflector in a liquid crystal display backlight unit.

The backlight unit may have four edges. Light-emitting diodes for launching backlight into the light guide layer may be located along one or more of the edges. Insert molding techniques may be used to mold the light guide layer over the light-emitting diodes. A substrate for mounting the light emitting diodes such as a flex circuit substrate may be provided with openings. The light-emitting diodes may be mounted upside down within the openings to conserve space.

The rear plate may be formed from laminated layers including a light guide plate layer for a backlight unit. A two-sided display may be formed in which one display is front facing and the other display is rear facing. The displays may share a common light guide layer.

Display structures and the rear plate may be mounted to opposing sides of a shelf portion of the peripheral housing member. The rear plate may be formed from electrochromic glass. Photovoltaic cells may be located under the rear plate and may produce power when activated by an external light source. Touch sensors may be located under the rear plate and may gather touch input. A control unit may be used to process touch commands on the rear plate to perform functions such as unlocking a magnetic latch that holds the upper housing to the lower housing.

The display may be controlled using timing and control circuitry on a display driver board. The driver board may be mounted within a clutch barrel that contains the hinges. The driver board may be mounted within the clutch barrel so that it lies perpendicular to the plane of the display or may be oriented at other orientations such as orientations that are within plus or minus 10° or 20° from perpendicular, orientations that are parallel to the plane of the display, or other orientations.

Further features of the invention, its nature and various advantages will be more apparent from the accompanying drawings and the following detailed description of the preferred embodiments.

DETAILED DESCRIPTION

This relates to electronic devices such as electronic devices with displays. The electronic devices may be tablet computers, cellular telephones and other handheld electronic devices, portable computers, other portable electronic devices, computer monitors, computer monitors with embedded computers, televisions, and other electronic equipment. In a typical configuration, the electronic device is a portable computer, so examples that are based on portable computers are sometimes described herein as examples. This is, however, merely illustrative. Any suitable electronic device may be provided with a display and other structures of the types described herein if desired.

Figure 1A:
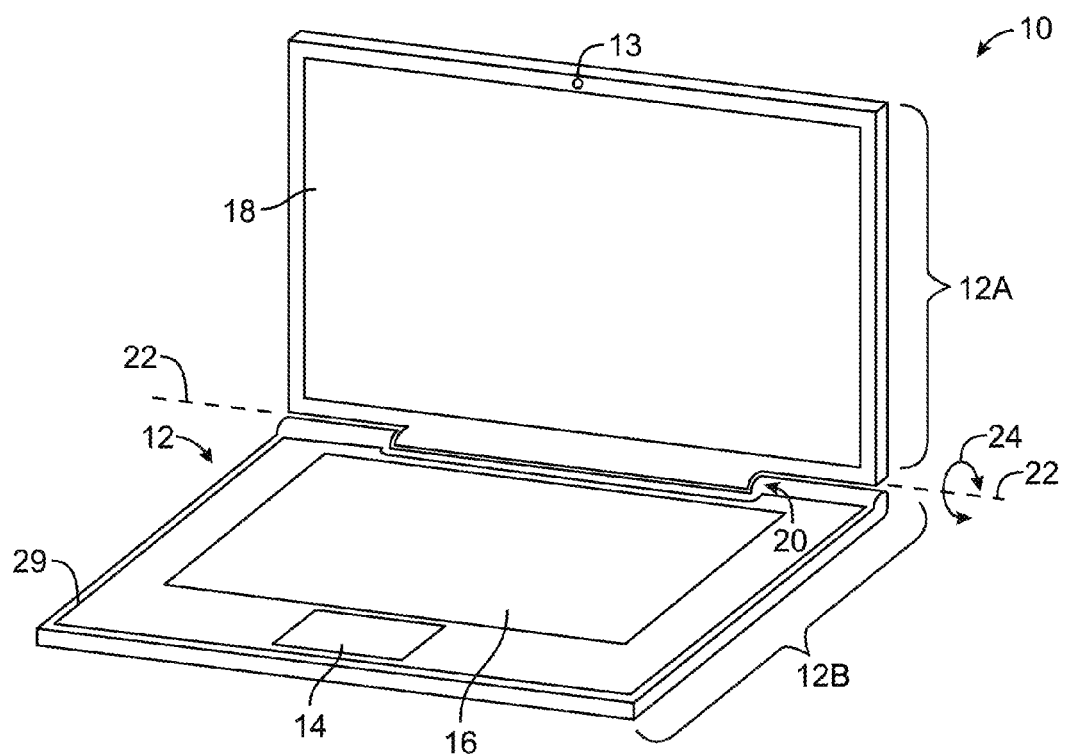
FIG. 1A is a front perspective view of an illustrative electronic device such as a portable computer in accordance with an embodiment of the present invention.

An illustrative electronic device (e.g., a portable computer) is shown in FIG. 1A. As shown in FIG. 1A, electronic device 10 may have a housing such as housing 12. Housing 12 may be formed from materials such as metal (e.g., aluminum), ceramic, glass, plastic, carbon fiber and other fiber composites, other materials, and combinations of these materials.

Housing 12 may include upper housing portion 12A and lower housing portion 12B. Housing portions 12A and 12B may be connected using hinge structures in region 20 (sometimes referred to as a clutch barrel or clutch barrel structures). The hinges in clutch barrel 20 may allow upper housing 12A to rotate relative to lower housing 12B about rotational axis 22 in directions 24. Camera 13 may be formed along one of the edges of upper housing 12A (as an example).

Lower housing 12B, which may sometimes be referred to as a base or base unit, may include components such as keyboard 16 and pointing device 14. Pointing device 14 may be a track pad and may have associated buttons. Input-output ports may be provided in the housing for main unit 12B. The interior of main unit 12B may include components such as a main logic board, peripheral cards, a battery, communications circuits and busses, wireless transceiver circuitry, etc.

Upper housing 12A, which may sometimes be referred to as a display housing, may include display 18. Upper housing 12A may also include other electrical components. These components may be mounted within clutch barrel 20, behind display 18, or in the peripheral region surrounding the outer periphery of display 18.

Figure 1B:
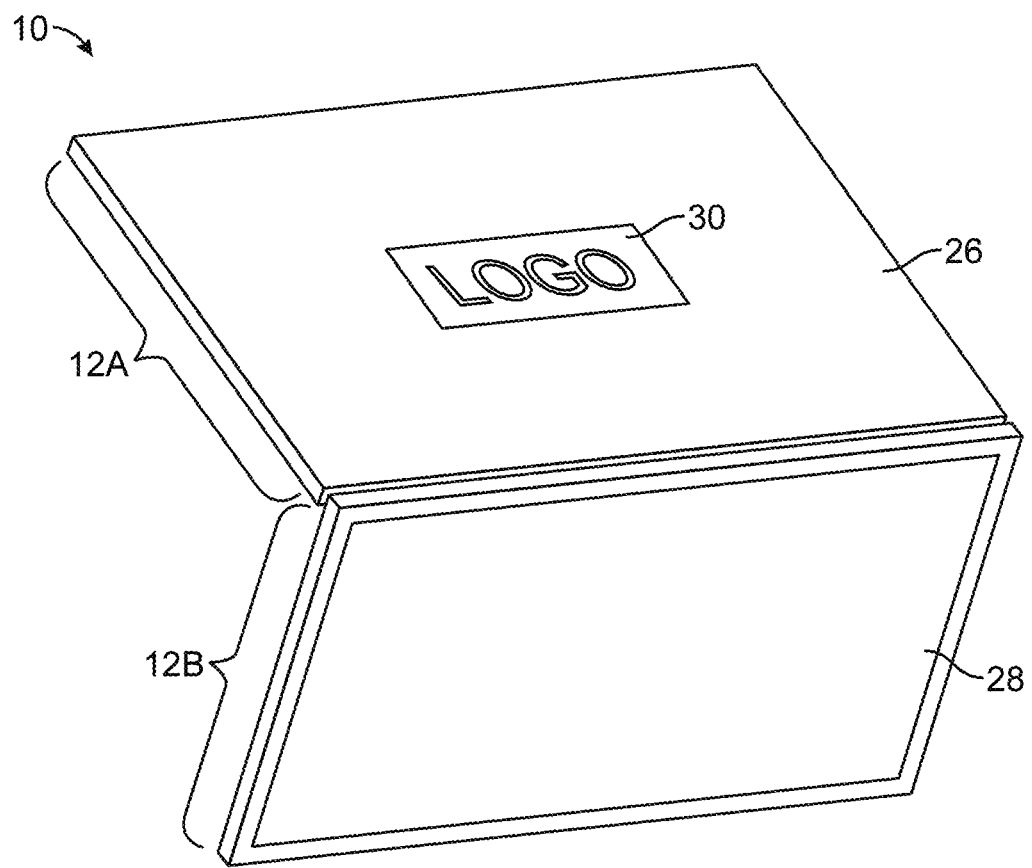
FIG. 1B is a rear perspective view of an illustrative electronic device such as the device of FIG. 1A in accordance with an embodiment of the present invention.

A rear perspective view of electronic device 10 of FIG. 1A is shown in FIG. 1B. As shown in FIG. 1B, device 10 may include outer (exterior) planar surfaces such as surfaces 26 and 28. Planar surface 26, which may sometimes be referred to as a rear surface, is on the opposite (opposing) side of housing 12A from display 18 (i.e., display 18 is typically referred to as being on the front side of display housing 12A, whereas surface 26 is typically referred to as being on the back side or rear of display housing 12A). Similarly, surface 28 may sometimes be referred to as forming a rear surface for base unit housing 12B. When the lid (structure 12A) of device 10 is open, the front and rear surfaces of structure 12A are both exposed.

In general, surfaces such as surfaces 26 and 28 may be formed from materials such as plastic, ceramic, glass, metal, composites, other materials, and combinations of these materials. With one suitable arrangement, which is sometimes described herein as an example, planar surface 26 (and optionally planar surface 28 and front surface 29 of FIG. 1A) may be formed from a rectangular plate of dielectric material such as glass, ceramic, or composite materials. The housing structures that form front surface 29, rear surface 26, and rear surface 28 are therefore sometimes referred to as being implemented using glass plates, glass-like planar structures, planar members, glass layers, housing plates, etc. Plate 26 (and the other plates used in device 10) may be less than 5 mm thick, less than 3 mm thick, less than 2 mm thick, less than 1 mm thick, 0.3 to 1.3 mm thick, about 0.8 mm thick, etc.

If desired, housing plate 26 may include a logo such as logo 30. Logo 30 may be formed from a different material than the rest of plate 26 or may be formed by patterning an interior layer of opaque ink in a way that allows a logo-shaped pattern of light to be emitted through plate 26. The light for illuminating logo 30 may be light that escapes from a liquid crystal display backlight through a reflector layer (e.g., a reflector layer formed from a sheet of translucent material such as white polyester).

Figure 2:
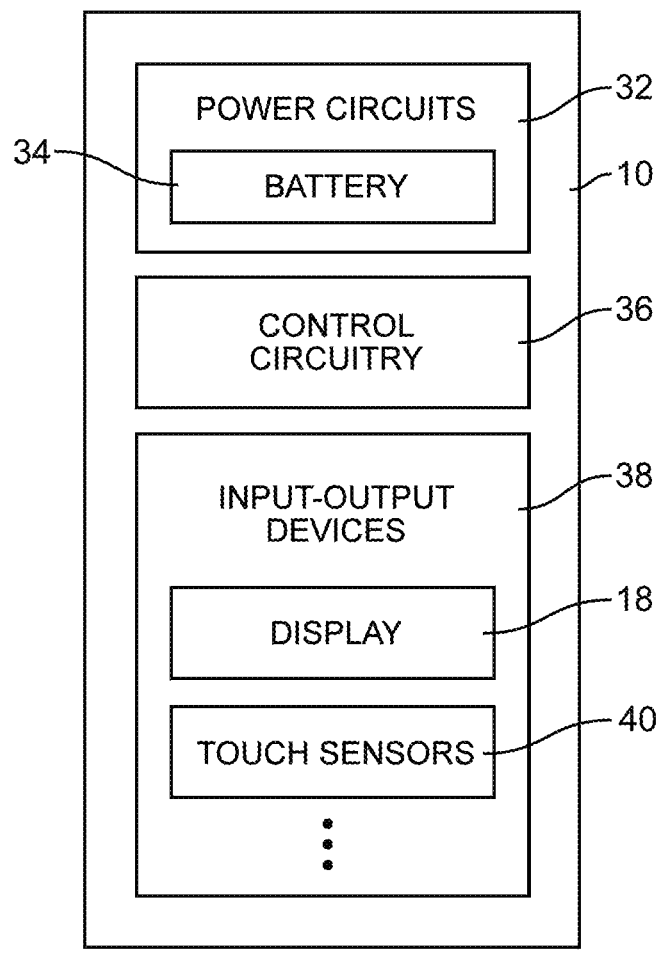
FIG. 2 is a schematic diagram of an illustrative electronic device such as the device of FIGS. 1A and 1B in accordance with an embodiment of the present invention.

A schematic diagram of electronic device 10 of FIGS. 1A and 1B is shown in FIG. 2. As shown in FIG. 2, device 10 may include a power source such as battery 34. Power circuits 32 may be used to deliver power from battery 34 or an alternating current (AC) line source to circuitry in device 10.

Control circuitry 36 may include microprocessors, digital signal processors, microcontrollers, and control circuitry in application-specific integrated circuits. Control circuitry 36 may also include memory circuitry such as hard drive devices, solid state storage, volatile and non-volatile memory chips, memory circuits that are part of processors and other integrated circuits, and other storage devices. During operation of device 10, control circuitry 36 may be used to supply control signals to adjustable components in device 10. Control circuitry 36 may also be used to transmit and receive data from external equipment.

Input-output devices 38 may be used to assist control circuitry 36 in interfacing with a user of device 10 and external equipment. For example, input-output devices 38 may include user input interfaces such as mice, trackballs, track pads, buttons, touch sensors, touch screen displays, cameras, microphones, speakers, etc. Input-output devices 38 may also include data ports, audio ports, and other input-output ports. Wireless circuitry in devices 38 and associated antennas (e.g., radio-frequency transceiver circuitry) may be used in transmitting and receiving radio-frequency antenna signals (e.g., cellular telephone signals, wireless local area network signals, etc.). Among other components, input-output devices 38 may include a display such as display 18 (see, e.g., FIG. 1A) and touch sensors 40.

Display 18 may be a plasma display, an organic light-emitting diode (OLED) display, a liquid crystal display (LCD), or other suitable display. Display 18 may be rectangular and may have four peripheral edges (e.g., right, left, top, and bottom edges that run around the outer periphery of display 18). Touch sensors 40 may be implemented using capacitive touch sensors, acoustic touch sensors, piezoelectric touch sensors or other force-sensing components, optical touch sensors, resistive touch sensors, or other touch sensitive components. Touch sensors 40 may be implemented in an array of rows and columns (as an example). In a typical scenario, touch sensors 40 may be implemented as an array of capacitive sensor electrodes formed from a conductor such as indium tin oxide and may be integrated into one of the layers of display 18 to form a touch screen display. Other types of configurations may be used if desired (e.g., to implement touch sensitive buttons, to implement one-dimensional sliders based on touch technology, etc.). Touch sensors may, if desired, be placed under rear plate 26, so that touch input can be gathered from the rear surface of housing 12A.

The structures such as the housing structures in display housing 12A that surround and encase the internal components of display 18 are sometimes said to form a module. Display housing 12A and the display structures that are used in forming display housing 12A are therefore sometimes referred to as forming a display module.

Figure 3:
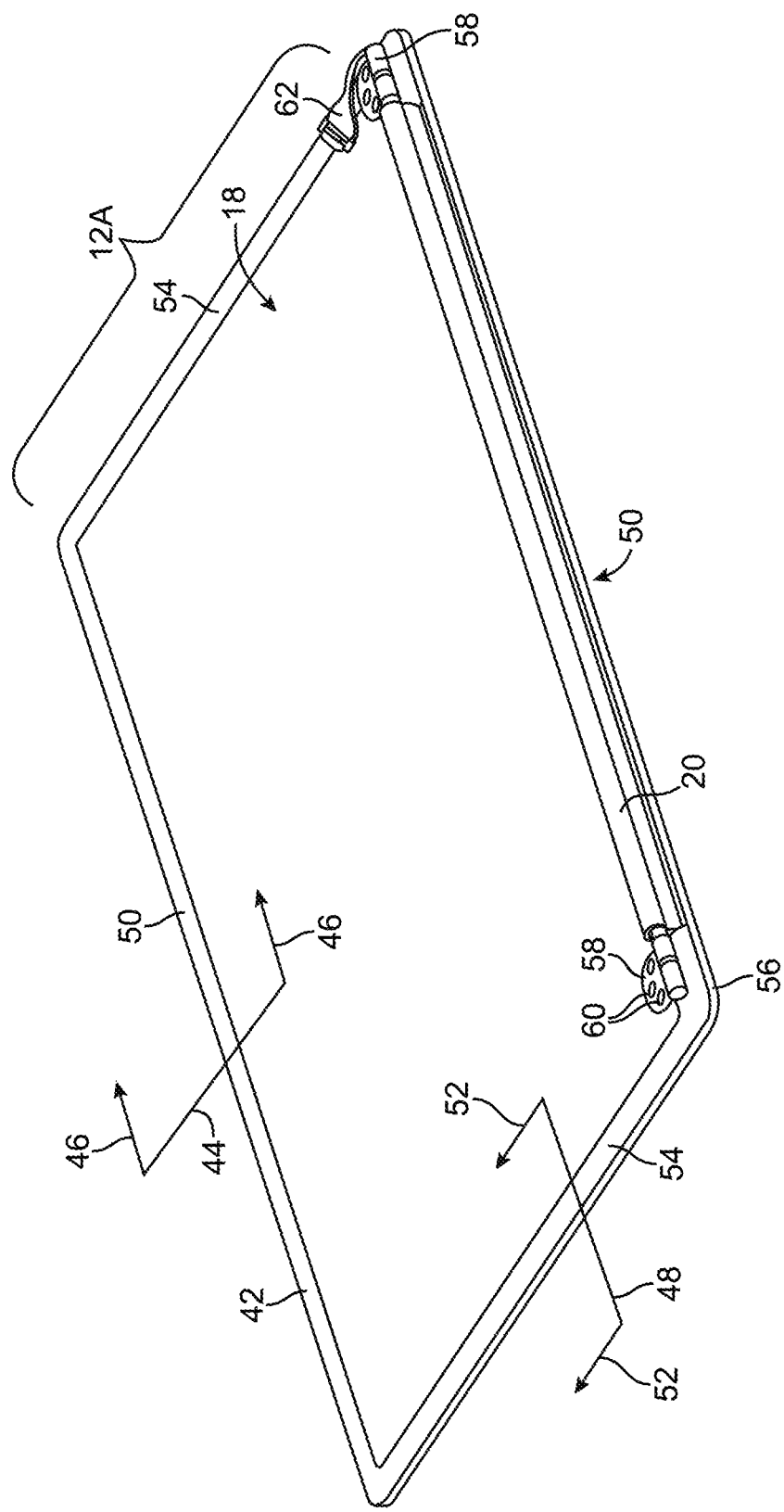
FIG. 3 is a perspective view an illustrative display module of the type that may be used to form the upper housing of a portable computer of the type shown in FIGS. 1A and 1B in accordance with an embodiment of the present invention.

A perspective view of an illustrative display module (module 12A) is shown in FIG. 3. As shown in FIG. 3, display module 12A may include a central planar display region for display 18 surrounded by peripheral housing structures. Display 18 may, for example, be surrounded by a peripheral housing member such as band-shaped peripheral member 56 of the type that is sometimes referred to as a frame. Peripheral housing member 56 may run along each of the four edges of display 18, thereby surrounding display 18. An optional rectangular bezel such as bezel 42 may be used to provide a cosmetic trim around the four edges of display 18 if desired. Hinges such as hinges 58 may be associated with clutch barrel 20. Each hinge may include holes such as holes 60 through which screws may pass to screw hinges 58 to lower housing 12B. Hinges 58 of FIG. 3 may be attached to mating hinge structures in the hidden portion of clutch barrel 20 of FIG. 3. Hinge friction may be used to allow a user to place display housing 12A at a desired orientation with respect to base housing 12B.

A cable such as a coaxial cable or flex circuit cable 62 may be used to route electrical signals to and from display 18 and other components in display module 12A. When display module 12A is mounted to lower housing 12B, the end of cable 62 may be plugged into a mating connector (e.g., a connector associated with another cable or a printed circuit board). Cable 62 may be used to carry image data that is to be displayed on display 18. Cable 62 or other cables may also be used to carry antenna signals, control signals, data signals, and other signals that are to be conveyed between housings 12A and 12B. Cable 62 may be located at a corner of the display, at a point that is midway along one of the edges of the display, at other locations, etc.

Figure 4:
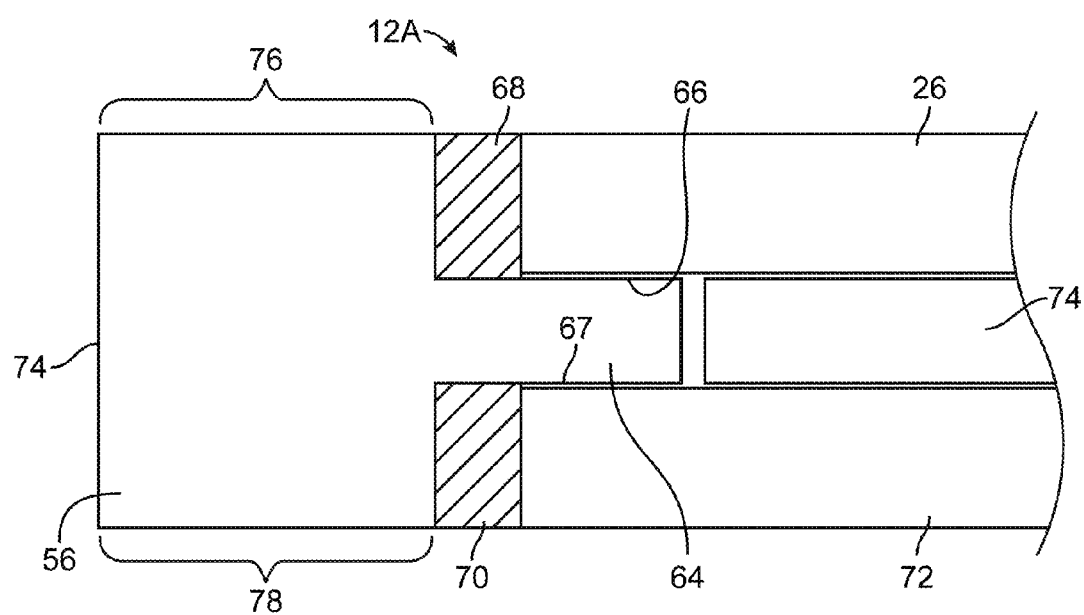
FIG. 4 is a cross-sectional side view of an edge portion of the display module of FIG. 3 showing how the display module may have a six-sided box configuration in accordance with an embodiment of the present invention.

Display module 12A may have four edges such as upper and lower edges 50 and left and right edges 54. A cross-sectional view of a display module edge (e.g., a cross-sectional view of an edge of a display module such as a view of edge 50 of FIG. 3 taken along line 44 and viewed in directions 46 or of edge 54 of FIG. 3 taken along line 48 and viewed in directions 52) is shown in FIG. 4. As shown in the example of FIG. 4, display module 12A may have a rear planar member such rear plate 26. Rear plate 26 may be formed from one or more layers of material such as one or more layers of glass, ceramic, metal, plastic, composites, conductive materials, dielectrics, etc. For example, rear plate 26 may include at least an exterior portion that is formed from a layer of glass.

Peripheral housing member 56 may have a T-shaped cross-section, as shown in FIG. 4. The stem of the T may form shelf structure 64. The top of the T may form a peripheral outer housing wall including outer peripheral surface 74, rear surface 76, and front surface 78. Front surface 78 may, if desired, be covered with a cosmetic bezel (see, e.g., bezel 42 of FIG. 3). Peripheral housing member 56 may be formed from metal (e.g., aluminum, stainless steel, titanium, etc.), composites (e.g., carbon fiber), or other suitable materials.

Shelf structure 64 may have a rear surface such as surface 66 and a front surface such as front surface 67. Rear planar member 26 may be supported by rear shelf surface 66. Display structures 72 may be supported on front shelf surface 67. Elastomeric gaskets 68 and 70 may be used to help prevent damage to the edges of plate 26 and display structures 72. In this configuration, peripheral housing member 56 may surround the four edges of rectangular display structures 72 and the four edges of rectangular rear plate 26.

Display structures 72 may include an outermost planar member such as a layer of coverglass (i.e., a plastic or glass covering plate on the front of display module 12A) and inner layers such as a color filter layer, a thin-film transistor layer, an optional touch sensor array, polarizers and other optical films, etc. If desired, the layer of coverglass may be omitted from display 18 and the outermost layer of display structures 72 (e.g., a polarizer, a color filter layer, or other such layer) may serve as the outermost layer of display 18. Because structures 72 typically include at least one outer planar layer, structures 72 are sometimes referred to as forming a front plate or front-side planar structures. Internal structures 74 may be interposed between rear plate 26 and front plate 72. Internal structures 74 may include components such as display components (e.g., backlight structures, polarizers and other optical films, a light reflector, etc.

The structures of display module 12A of FIG. 4 form a type of six-sided box. Four of the sides of the box are formed by the upper, lower, left, and right edges of peripheral housing member 56. The other two sides of the box may be formed by rear plate 26 and front plate 72, respectively. A box construction of this type may be strong and stiff, allowing the thickness of layers 72, 74, and 26 to be minimized without compromising the structural integrity of display module 12A. This box construction may also facilitate greater freedom of assembly and rework over display module constructions that permit assembly from only one direction. Display module 12A permits assembly from two opposing directions (front and rear). During manufacturing operations, front plate 72 may be attached to housing member 56 before rear plate 26 or rear plate 26 may be attached to housing member 56 before front plate 72. If a repair is needed, one of the plates can be removed and the interior of display module 12A can be accessed from the side of module 12A that has been opened.

Figure 5:
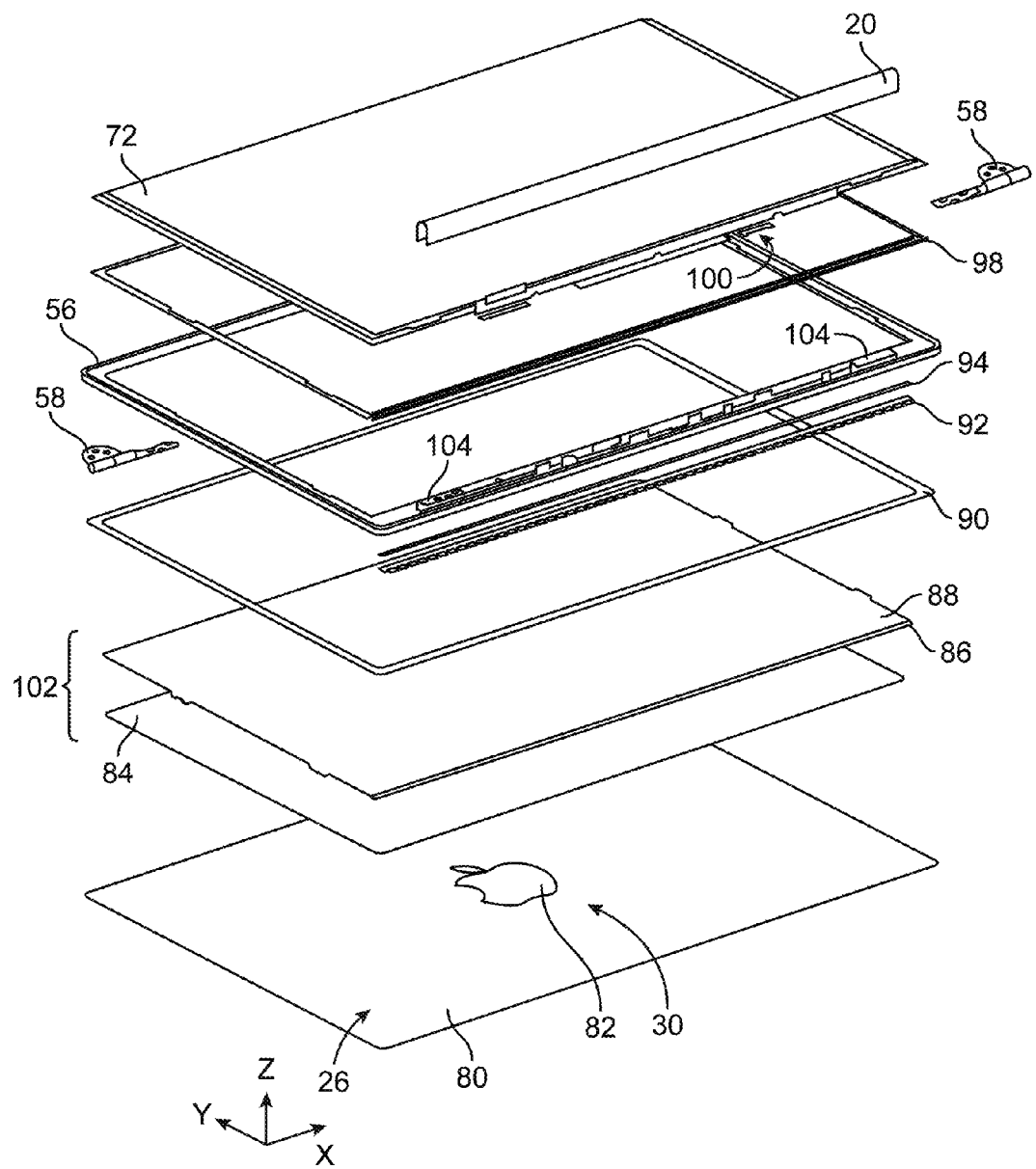
FIG. 5 is an exploded perspective view of a display module in accordance with an embodiment of the present invention.

An exploded perspective view of an illustrative display module is shown in FIG. 5. As shown in FIG. 5, display module 12A may include rear plate 26. The inner surface of rear plate 26 may be coated with an opaque layer such as ink layer 80. Ink layer 80 may be patterned. For example, an opening such as opening 82 may be formed in ink layer 80. Opening 82 may have the shape of a logo and may be used in forming logo 30 of FIG. 1B.

Ink layer 80 may have any suitable color or colors such as blue, green, red, magenta, grey, etc. Multiple colors of ink may be formed on a single plate. For example, a pattern of strips, dots, or other designs may be formed using inks of different colors and shades. Screen printing, shadow masking, pad printing, ink-jet printing, spraying, and other fabrication techniques may be used informing patters of ink in layer 80. If desired, the ink pattern for layer 80 may be customized. For example, a user may select from a predetermined list of patterns or may upload a photograph or other image to be used as a template for forming the ink pattern. Custom ink layers 80 that are formed in this way may have one color, two colors, three colors, four colors, or more than four colors. The resolution of the ink layer pattern may be limited (e.g., to facilitate high manufacturing throughput) or may be near photographic in quality (e.g., 30-300 dots per inch). Combinations of predetermined ink patterns (e.g., standard border templates) and custom patterns (e.g., customized regions of ink layer 80) may be formed if desired.

Structures 102 may form a backlight unit for display 18. Structures 102 may include a light reflector such as reflector 84. Reflector 84 may be formed from a translucent layer of material such as white polyester. Reflector 84 may reflect diffuse light towards display structures 72. Some light may pass through reflector 84 and may escape through opening 82 in plate 26 to serve as illumination for logo 30. Structures 102 may include a light guide (sometimes referred to as a light guide plate). Light guide plate 86 be about 0.55 mm to 0.7 mm thick and may be formed from a layer of clear plastic such as polymethylmethacrylate (as an example). Light-emitting diodes on light-emitting diode flex circuit 92 may launch light into one or more edges of light guide plate 86. This light may be spread over the surface area of display structures 72 by total internal reflection within plate 86. Some of the light escapes plate 86 in the direction of display structures 72 and serves as backlight for display 18. When the light escapes plate 86 in the direction of reflector 84, reflector 84 will reflect most of the escaped light back through the light guide plate and towards display structures 72.

Light guide plate 86 may be coated with one or more optical films 88 (e.g., birefringent films, polarizing films, and other films that form part of a liquid crystal display or other suitable display).

Adhesive ring 90 may be formed from a pressure sensitive adhesive and may be used to attach rear plate 26 to peripheral housing member 56 (e.g., by bonding the plate to shelf surface 66).

Hinges 58 may be screwed to lower housing 12B (FIG. 1A) and may each have a shaft or other structure that mates with a portion of a respective one of mating hinge structures 104. Mating hinge structures 104 on member 56 may be formed as an integral portion of member 56 or may be a separate structure that is attached to member 56.

A light-blocking seal structure such as shelf foam 94 may be used in preventing light leakage in the display. A timing controller integrated circuit (sometimes referred to as an LCD driver chip) for display 18 may be mounted on substrate 100 (sometimes referred to as an LCD driver board). The timing controller integrated circuit may serve as an interface between the graphics circuitry (integrated or discrete) in device 10 and the row and column drivers in the pixel array of display 18.

Clutch barrel cover 20 may cover LCD driver board 100, hinge structures 104, and other structures mounted along the lower edge of member 56. Display structures 72 may include an optional cover layer (e.g., a cover glass layer), a color filter layer (which may serve as a cover glass layer in the absence of a separate cover glass layer), a thin-film transistor layer (i.e., a layer that contains an array of thin-film transistor drivers that create electric fields for controlling associated liquid crystal material that is interposed between the color filter layer and thin-film transistor layer), an optional touch sensor array layer, a polarizer layer or layers, birefringent films, other optical films, etc.

Figure 6:
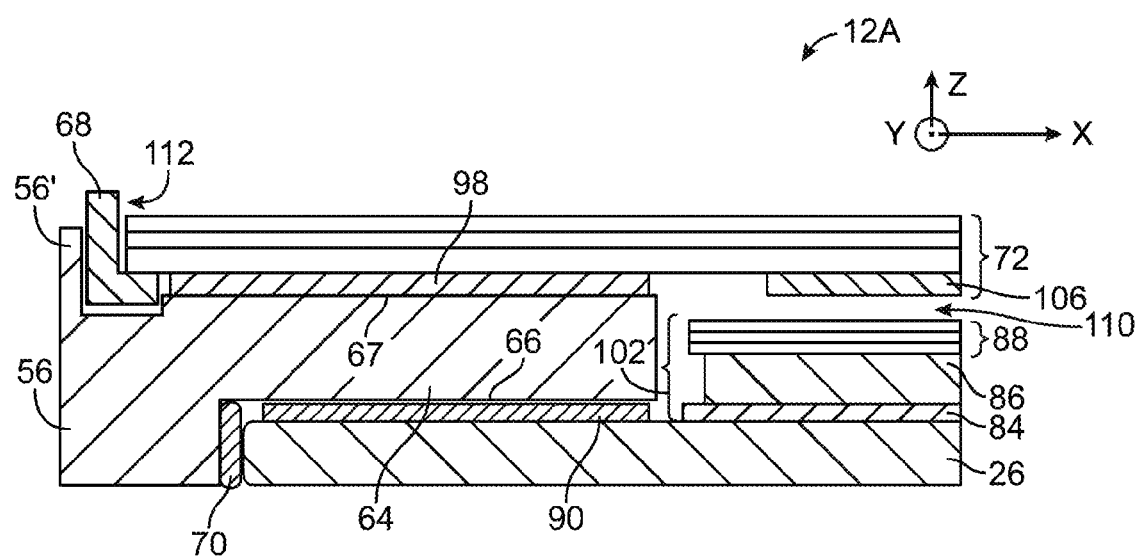
FIG. 6 is a cross-sectional side view of an edge portion of a display module of the type shown in FIG. 3 showing how display components such as a backlight layer may be interposed between a rear housing layer and display layers in accordance with an embodiment of the present invention.

As shown in FIG. 6, display structures 72 (i.e., the front plate of display module 12A) may be attached to surface 67 of shelf structure 64 using adhesive 98 and rear plate 26 may be attached to surface 66 of shelf structure 64 using adhesive 90. The components of backlight unit 102 may be mounted inside frame 56 and, once assembled, may be captured between liquid crystal display structures 72 and rear plate 26. As shown in FIG. 6, the resulting assembly may form a solid stack that is interrupted only by minimal air gap 110 (e.g., an air gap in the range of 0.05 to 2 mm) between back light unit 102 and lower polarizer layer 106 on display structures 72 to prevent wetting in optical films 88. Some or all of the layers of material in backlight unit 102 may be attached to each other using adhesive or some or all of the layers of material in backlight unit 102 may be unattached (floating). Floating arrangements may help prevent damage to backlight unit 102 as device 10 is flexed during use.

The configuration of FIG. 6 allows the lateral (X and Y) dimensions of display structures 72 (and therefore display 18) to be maximized. Gasket 68 (sometimes referred to as a trim bead) may be interposed between portion 56' of member 56 and the outermost edge of display structures 72. Protruding portion 112 of gasket 68 may help maintain a gap between the exposed surface of display structures 72 and main unit (top case) 12B when upper portion (lid) 12A is in a closed position. As described in connection with FIG. 4, arrangements of the type shown in FIG. 6 form a six-sided box construction that may enhance the rigidity of the assembly and thereby help prevent undesired bending or twisting of display module 12A.

Figure 7:
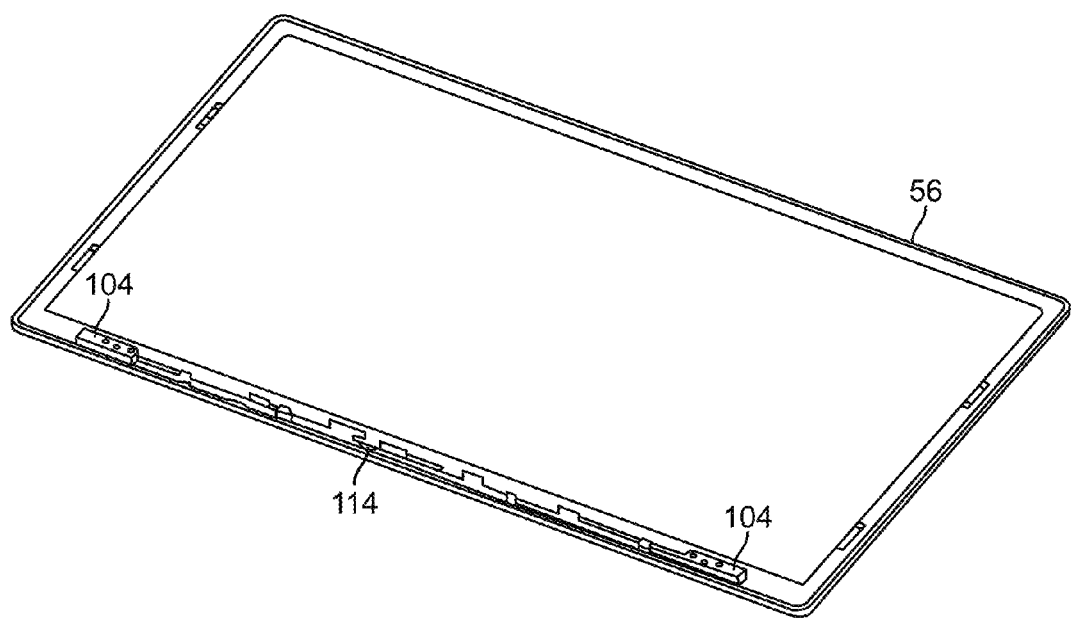
FIG. 7 is a perspective view of an illustrative frame that may be used in forming a display module in accordance with an embodiment of the present invention.

FIG. 7 is a perspective view showing an illustrative arrangement that may be used for peripheral housing member 56. As shown in FIG. 7, housing member 56 may have integral hinge structures 104, each of which mates with a corresponding one of hinges 58 of FIG. 5. An opening such as rectangular hole 114 may be used to accommodate a flexible printed circuit ("flex circuit") cable for connecting LED flex circuitry to driver board 100, or for connecting circuitry in display housing 12A to circuitry in base housing 12B.

Figure 8A:
FIG. 8A is a cross-sectional side view of a display module frame before insertion of front and rear rectangular plate structures in accordance with an embodiment of the present invention.
Figure 8B:
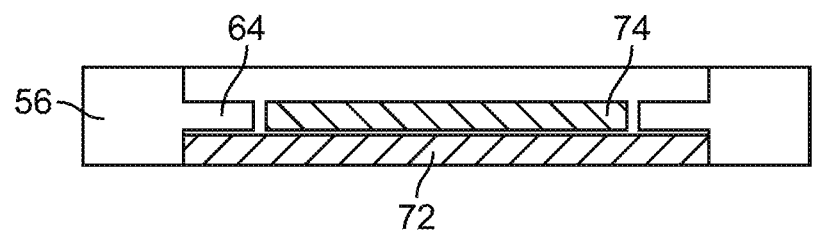
FIG. 8B is a cross-sectional side view of the display module of FIG. 8A following insertion of a front or rear plate structure in accordance with an embodiment of the present invention.
Figure 8C:
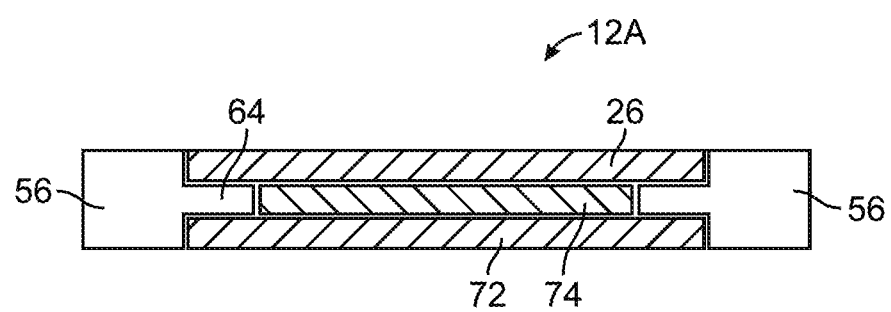
FIG. 8C is a cross-sectional side view of the display module of FIG. 8B following attachment of both front and rear plate structures in accordance with an embodiment of the present invention.

FIGS. 8A, 8B, and 8C are simplified cross-sectional side views of display module 12A showing how display module 12A may be assembled. Initially, peripheral housing member 56 may appear as shown in FIG. 8A. In this configuration, no additional components have been attached to housing member 56.

Additional components such as a front plate or rear plate and interior components may then be attached to housing member 56. In the FIG. 8B example, display structures 72 have been attached to shelf 64 and interior components 74 have been mounted within the interior of housing member 56.

As shown in FIG. 8C, assembly may be completed by adding the remaining plate structure (i.e., rear plate 26 in the FIG. 8C example). Screws and other fasteners, adhesives, and other attachment mechanisms may be used when mounting components within housing 12A. Because components can be mounted to both the front and rear sides of housing member 56, assembly and rework operations are generally more flexible than arrangements such as conventional "bucket" display enclosure arrangements in which components can be mounted in only a single direction.

Figure 9:
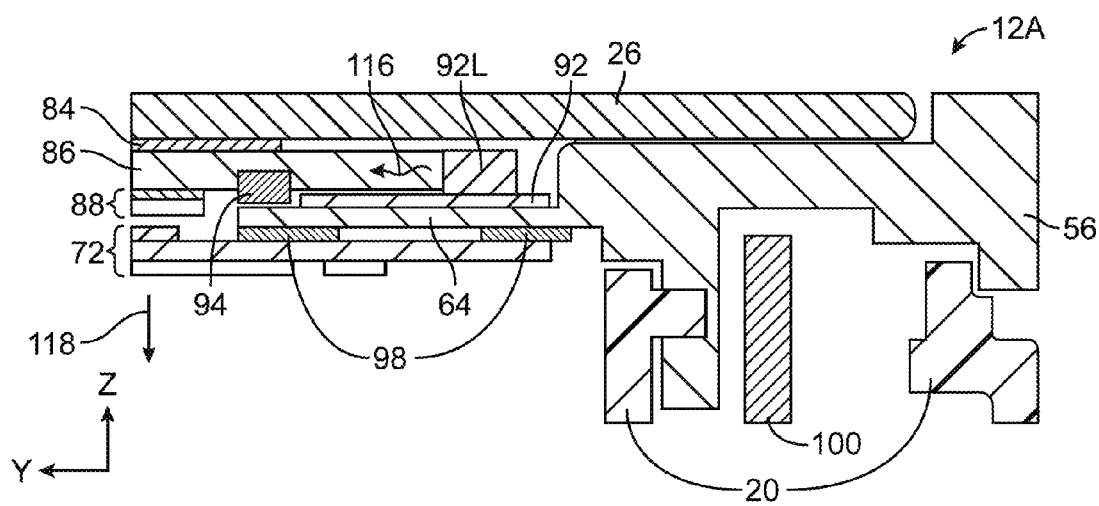
FIG. 9 is a cross-sectional diagram of an edge portion of an illustrative display module showing how light emitting diodes for providing backlight to a display may be mounted on a shelf in the display module frame in accordance with an embodiment of the present invention.

FIG. 9 is a cross-sectional side view of a portion of display module 12A along its lower (clutch barrel) edge. As shown in FIG. 9, shelf portion 64 of housing member 56 may serve as a support for light sources such as light-emitting diodes 92L. Diodes 92L may be mounted on flex circuit 92 and may emit light 116 into light guide plate 86. Reflector 84 may ensure that most of light 116 is scattered in direction 118 through display structures 72. Foam strip 94 may be interposed between light guide plate 86 and shelf portion 64 of housing member 56 and may form a light-tight seal that blocks stray rays of light 116 from the array of diodes 92L on flex circuit 92 and thereby ensures that the image quality of display structures 72 is not adversely affected by light leakage.

Driver board 100 may include a timing controller integrated circuit (IC) for the thin-film transistors and other display circuitry of display 18. The timing controller integrated circuit may be mounted on any suitable substrate. For example, driver board 100 may be based on a substrate such as a rigid printed circuit board substrate such as FR-4, a flexible polymer sheet such as a polyimide flex circuit substrate, a ceramic plate, other dielectric substrate materials, etc. To improve mounting efficiency, driver board 100 may be arranged so that the plane of driver board 100 lies parallel to the "Z" axis of display module 12A (i.e., so that driver board 100 is perpendicular to display 18 and lateral axis "Y," which runs parallel to the left and right edges of display module 12A). Driver board 100 may also be mounted at other orientations with respect to display 18 (e.g., parallel to display 18, within plus or minus 10° or 20° of a plane that is perpendicular to the plane of display 18, etc.).

Antennas may be located within housing member 56. For example, recesses may be formed within member 56 that accommodate antenna structures. The recess may, for example, be formed by milling, casting, or otherwise removing part of the conductive material in a conductive (e.g., metal) housing member such as member 56. A recess of this type may form a conductive cavity. The conductive cavity may be used in forming a cavity backed antenna. Printed circuit boards and other substrates that contain metal traces may be placed within a conductive cavity in member 56.

Figure 10:
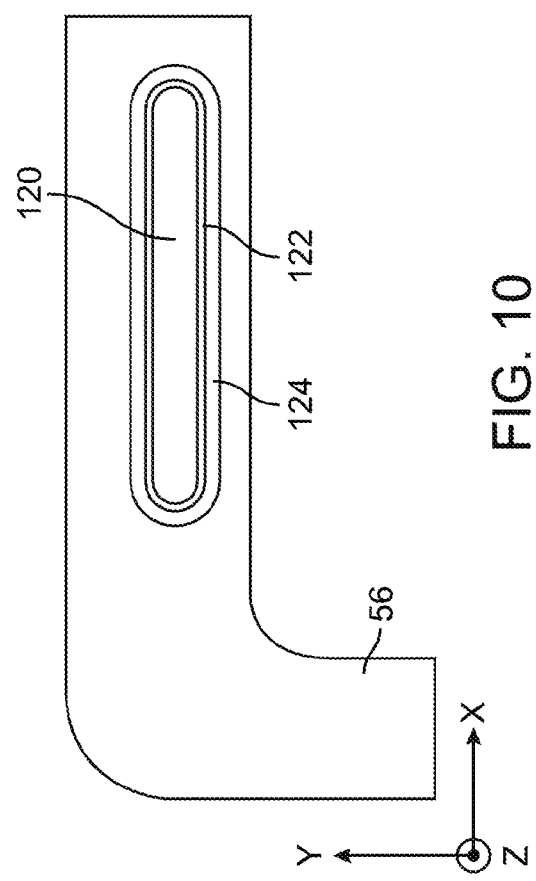
FIG. 10 is a top view of a portion of an illustrative display module frame showing how an opening may be formed in the frame to accommodate an antenna in accordance with an embodiment of the present invention.

If desired, openings may be formed in housing member 56 that pass completely through housing 56. An opening may, for example extend from the front surface to the rear surface of housing member 56 (running along dimension Z), as shown by opening 120 in FIG. 10. Within this opening, printed circuit boards with traces, metal structures formed from parts of a housing, wire, metal foil, metal members, or other conductive structures may be formed. These conductive structures may form some or all of an antenna (see, e.g., antenna structure 122 of FIG. 10, which is separated from the inner walls of opening 120 in housing member 56 by dielectric insulating member 124). Slot antennas may be formed in housing member 56 by forming openings of the type shown in FIG. 10. These openings may form closed slots that are completely surrounded by metal or other conductive material in housing member 56 or open slots that have a closed end and an open end).

Figure 11A:
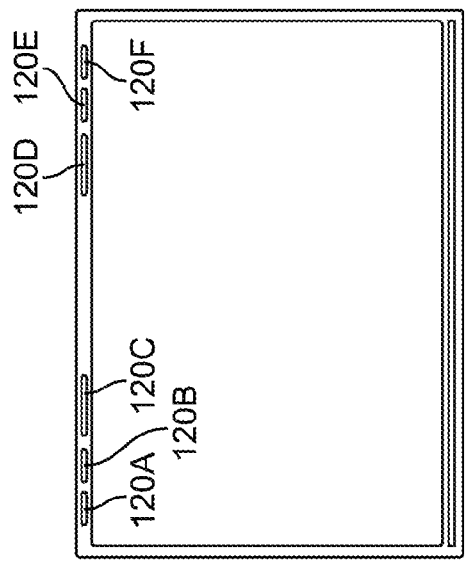
FIG. 11A is a top view of a display module frame showing illustrative antenna locations in accordance with an embodiment of the present invention.

FIG. 11A shows how multiple antenna openings may be formed through housing member 56 (e.g., openings 120A, 120B, 120C, 120D, 120E, and 120F).

Figure 11B:
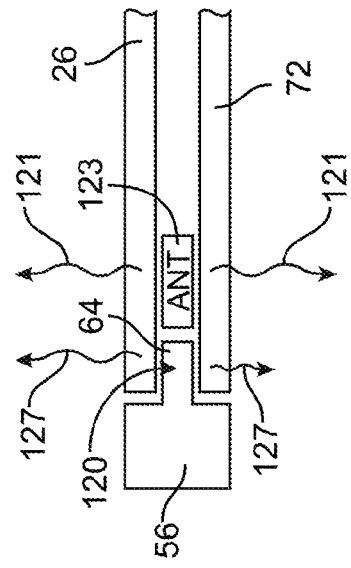
FIG. 11B is a cross-sectional side view of an illustrative display module showing how radio-frequency antenna signals may pass through portions of front and rear housing plates when an antenna is formed in part of a peripheral housing frame member and when an antenna is formed adjacent to a peripheral housing frame member in accordance with embodiments of the present invention.

FIG. 11B is a cross-sectional side view of an illustrative display module showing how radio-frequency antenna signals 127 may pass through portions of front plate 72 and rear plate 26 in display module 12A when an antenna is formed in opening 120 in a portion of housing member 56 such as shelf portion 64. FIG. 11B also shows how radio-frequency antenna signals 121 may pass through portions of front plate 72 and rear plate 26 when an antenna such as antenna 123 is formed from a structure that is mounted at a suitable location within the interior of display module 30 (e.g., adjacent to shelf 64). In configurations in which radio-frequency signals can propagate through both the front and rear surfaces of display module 12A, potential reductions in antenna efficiency upon closure of the lid of device 10 can be minimized.

Antennas such as antennas in openings 120 and antenna 123 of FIG. 11B may cover communications bands such as cellular telephone bands, satellite navigation bands, wireless local area network bands, or other communications bands of interest.

Figure 12:
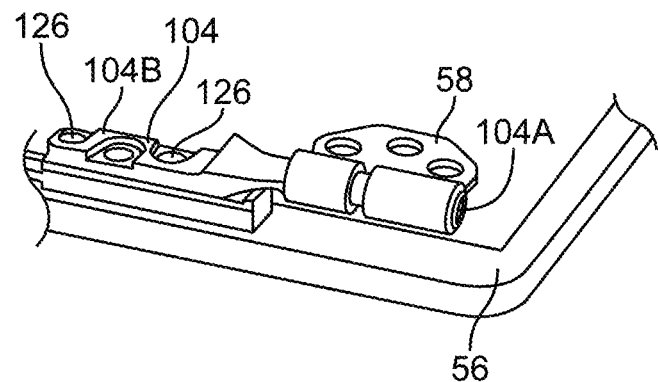
FIG. 12 is a perspective view of an illustrative discrete clutch mechanism of the type that may be used in a hinge for the portable computer of FIGS. 1A and 1B in accordance with an embodiment of the present invention.
Figure 13:
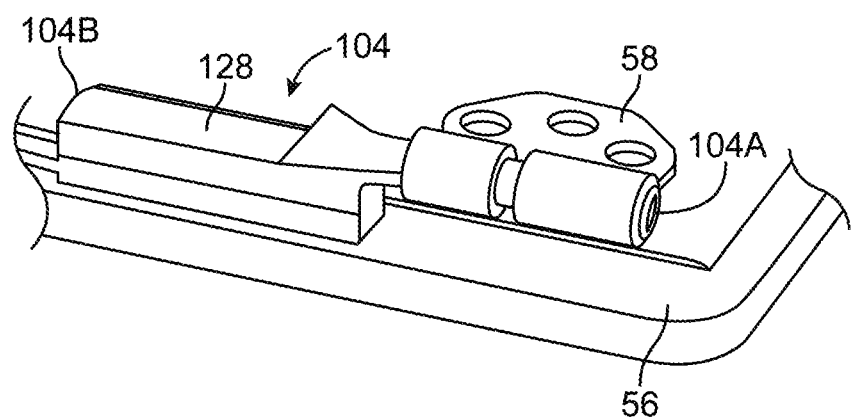
FIG. 13 is a perspective view of an illustrative integrated clutch mechanism of the type that may be used in a hinge for the portable computer of FIGS. 1A and 1B in accordance with an embodiment of the present invention.

A perspective view of an illustrative configuration that may be used for hinge 58 and mating hinge structure 104 is shown in FIG. 12. As shown in FIG. 12, hinge 58, which may sometimes be referred to as a clutch band, may have a cylindrical opening that receives shaft 104A of mating hinge structure 104. Hinge structure 104, which may sometimes be referred to as a clutch pillar, may have a base portion 104B that is separate from housing member 56. Adhesive, welds, screws, and other attachment mechanisms may be used in attaching hinge structure 104 to housing member 56. As shown in FIG. 12, for example, hinge structure 104B may have screw holes 126 that may receive screws to screw structure 104B to housing member 56. If desired, hinge structure (clutch pillar) 104 may be formed from metal or other material that is an integral portion of housing member 56 (see, e.g., the illustrative integral hinge structure arrangement of FIG. 13 in which surface 128 of hinge structure base 104B is devoid of screw holes).

Figure 14:
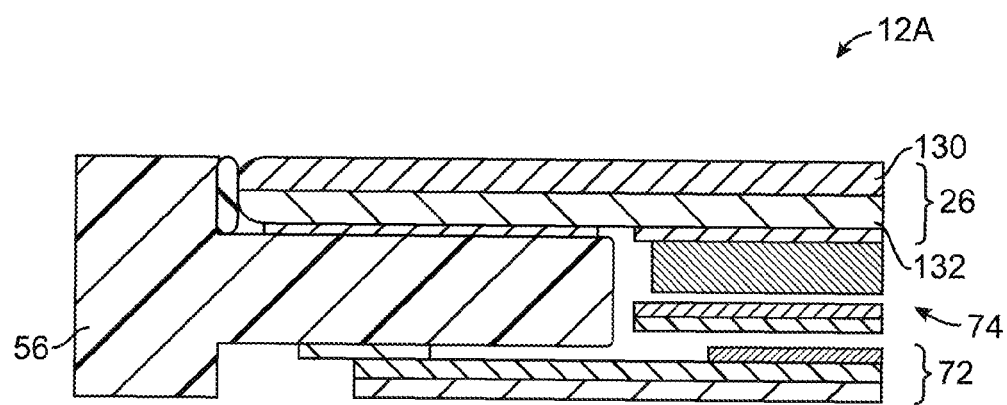
FIG. 14 is a cross-sectional side view of an edge portion of a display module showing how the display module may use laminated layers in forming the rear plate structure in accordance with an embodiment of the present invention.

Rear plate 26 of display module 12A may contain multiple layers of material. These layers may be attached to one another using adhesive or other suitable lamination techniques (e.g., by bonding layers to each other through the application of heat and pressure). The layers of rear plate 26 may include metal layers, plastic layers, glass layers, ceramic layers, layers of carbon fiber and other composites, other materials, and layers that include combinations of these materials. A metal layer or other durable layer may be bonded to a layer of a material such as glass or ceramic to contain shards of broken glass or ceramic material in the event that rear plate 26 is damaged. Coatings may also be applied to rear plate 26 to enhance environmental resistance, etc. (e.g., an oleophobic coating can be applied to resist oily fingerprints). In the example of FIG. 14, rear plate 26 has an outer layer 130 (e.g., glass, etc.) and an inner layer 132 (e.g., metal). Other laminated stacks may be formed if desired (e.g., stacks in which layer 130 is formed from one type of glass and layer 132 is formed from another type of glass, etc.).

Figure 15:
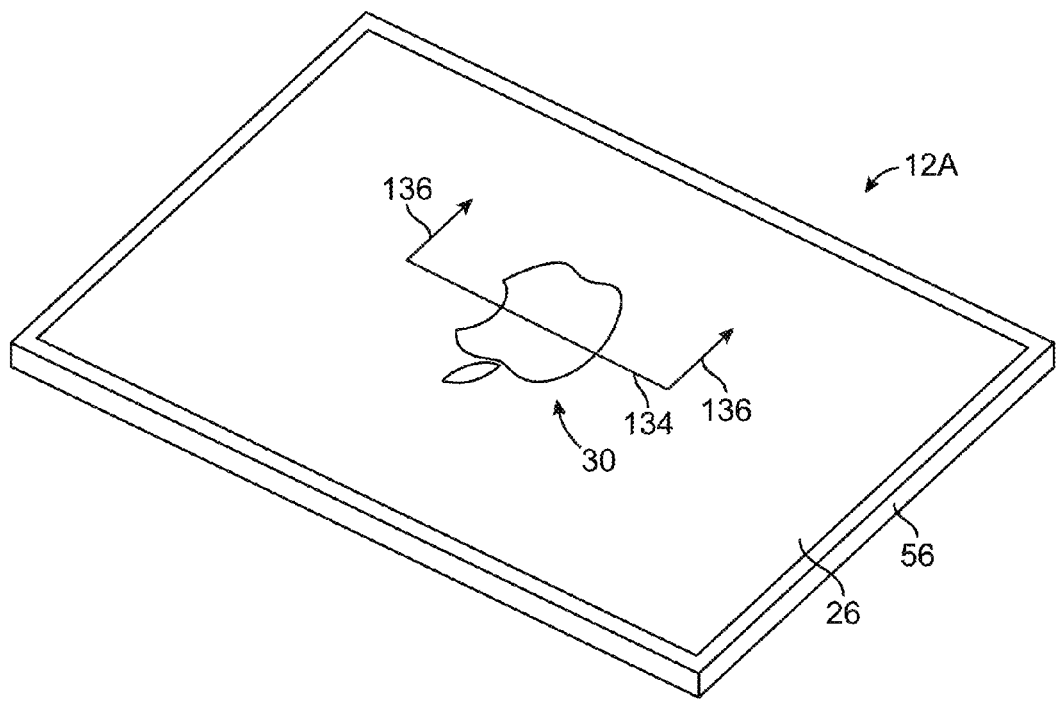
FIG. 15 is a perspective view of an illustrative display module having an illuminated logo in a rear plate structure in accordance with an embodiment of the present invention.
Figure 16:
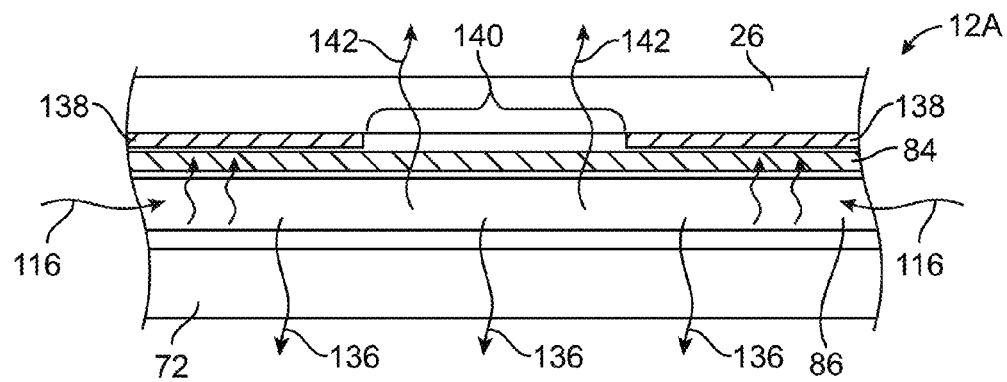
FIG. 16 is a cross-sectional side view of the display module of FIG. 15 taken through the logo of FIG. 15 in accordance with an embodiment of the present invention.

FIG. 15 is a perspective view of display module 12A showing how logo 30 may be formed in the middle of plate 26. A cross-sectional side view of display module 12A of FIG. 15 taken along line 134 and viewed in direction 136 is shown in FIG. 16. As shown in FIG. 16, display module 12A may have a light source that emits light 116 into light guide plate 86. Light 116 is scattered through the front of display module 12A (e.g., through liquid crystal display structures 72) as rays 136 and serves as backlight for display 18. Reflector 84 (e.g., a sheet of white polyester or other suitable translucent material) helps reflect light 116 in the direction of rays 136. However, some of light 116 escapes to the rear of display module 12A as light rays 142.

Rear plate 26 may be formed from a transparent substance such as clear glass, tinted glass, clear or tinted plastic, etc. Opaque masking layer 138 (e.g., a layer such as layer 80 of FIG. 5) may be formed as a patterned coating on the inner surface of rear plate 26. For example, ink layer 138 may be a layer of black ink that is coated over the entirety of rear plate 26 with the exception of logo-shaped opening 140 (e.g., an opening having the shape of logo 30 of FIG. 15 and opening 82 of FIG. 5). Light 142 can be blocked by ink layer 138, but can escape through opening 140 (e.g., as white light) and can pass through rear plate 26 to serve as internal illumination for logo 30. Ink layer 138 may have one or more colors (e.g., black, grey, blue, green, red, shades of these colors, etc.) and may be solid or patterned.

Masking layer 138 may be formed from a material that is radio transparent. This allows radio-frequency signals such as antenna signals to pass through layer 138 when plate 26 overlaps antennas formed in housing member 56 (e.g., when plate 26 and masking layer 138 cover antennas such as the antennas in openings 120 of FIGS. 10 and 11B, antennas in locations 120A, 120B, 120C, 120D, 120E, and 120F of FIG. 11A, and antennas such as antenna 123 of FIG. 11B).

Figure 17:
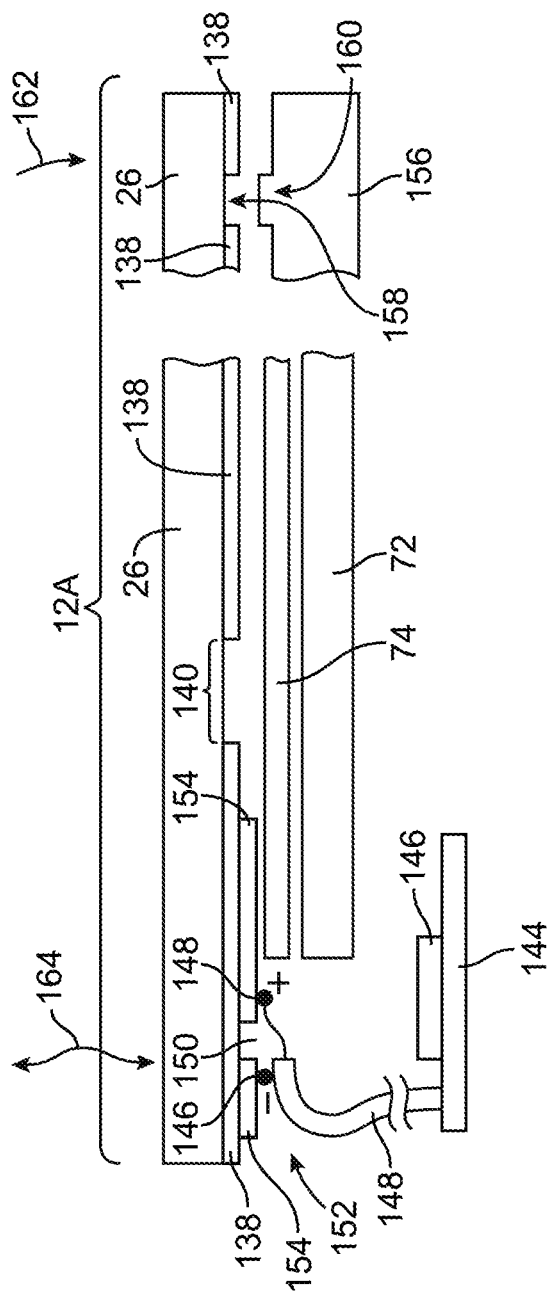
FIG. 17 is a cross-sectional side view of a display module showing how antenna traces may be formed on the underside of the rear plate structure in accordance with an embodiment of the present invention.

As shown in FIG. 17, an antenna such as antenna 152 may be formed under masking layer 138. Antenna 152 may be formed from conductive traces 154, metal wires, portions of housing member 56, or other antenna structures. Radio-frequency transceiver 146 may be mounted on a substrate such as printed circuit board 144. A transmission line such as a flex circuit cable or coaxial cable 148 may be used to couple transceiver 146 to antenna 152. Cable 148 may be coupled to antenna feed terminals 146 and 148. During operation, radio-frequency antenna signals 164 may be transmitted and received through masking layer 138 and rear plate 26 (and through the foam of display housing 12A). Rear plate 26 may be formed from a low-loss dielectric such as glass, ceramic, plastic, radio-transparent composites such as fiberglass composites, or other materials that do not significantly attenuate antenna signals.

If desired, display module 12A may include a camera such as camera 156. Camera 156 may have a lens such as lens 160 that is aligned with a corresponding opening such as opening 158 in masking layer 138. Opening 158 may allow light from an image such as light 162 to be received by lens 160. Cameras such as camera 156 may also be mounted in a front-facing configuration within housing 12A (see, e.g., camera 13 of FIG. 1A).

Figure 18:
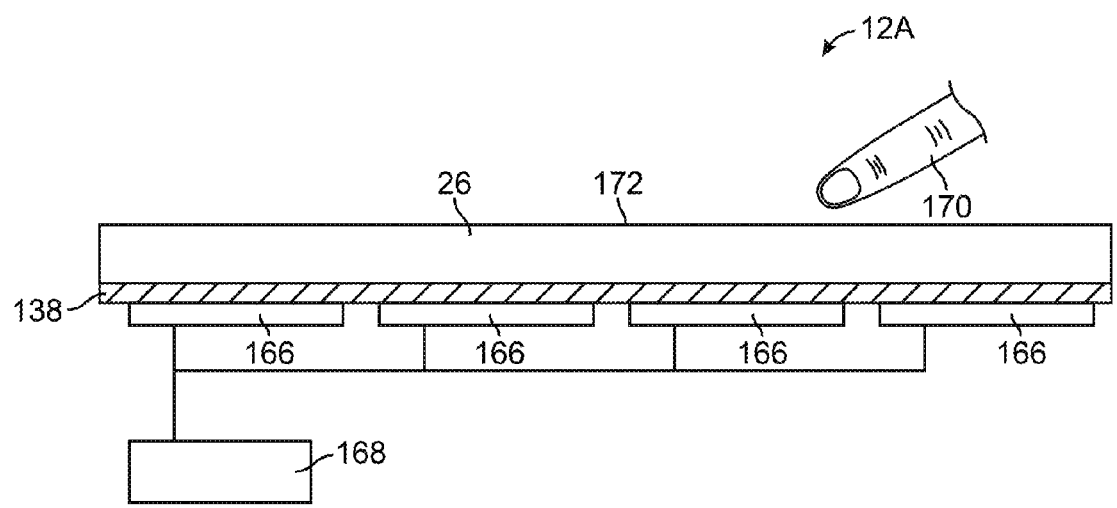
FIG. 18 is a cross-sectional side view of an illustrative display module having an integrated touch sensor formed under a rear plate structure in accordance with an embodiment of the present invention.

Rear plate 26 or display structures 72 may be provided with touch sensors (see, e.g., touch sensor 40 of FIG. 2). A touch sensor array having one or more touch sensor electrodes 166 may be formed under masking layer 138, as shown in FIG. 18. Touch sensor processor 168 may be used to convert capacitance data or other touch data from sensors (electrodes) 166 to position and motion information. The touch sensor array may be actuated by contact on (or in the immediate vicinity of) surface 172. Using processor 168, the touch sensor array may, for example, gather information on the location of a user's finger or other external object such as object 170 on or in the vicinity of surface 172 of rear plate 26 as the finger is used to input touch gestures. Touch signals from processor 168 may be provided to a microprocessor or other processing circuitry in control circuitry 36 (FIG. 2) for processing. In response, control circuitry 36 may take appropriate actions in device 10. In general, any display within device 10 (e.g., front-facing display 18 of FIG. 1A, rear facing displays, etc.) may be provided with touch sensors such as touch sensor 40 of FIG. 2 to implement a touch screen display.

For example, touch signals from a touch sensor under plate 26 may be used to lock or unlock lid 12A (e.g., using a magnetic catch or other latching structure), may be used to gather a password or other code, may be used to control audio playback or other media playback operations in device 10, or may be used for controlling other device functions. A touch sensor under rear plate 26 may, for example, be located under logo 130 (e.g., to implement an on-off switch for device 10 or a switch that toggles device 10 between a sleep state and an awake state). A touch sensor array of this type may be used to detect touch gestures such as swipe gestures. When a swipe is detected using electrodes 166 and circuit 168, an appropriate action may be taken (e.g., device 10 may be awoken from a sleep state, may be locked or unlocked, may open or close a mechanical or magnetic latch, may change a volume in a media playback application, etc.). Magnetic latches may be implemented using permanent magnets, magnetic materials (e.g., magnetic stainless steel such as 410 or 430 stainless in all or part of housing member 56 or a separate structure), electromagnets, and other suitable arrangements.

Figure 19:
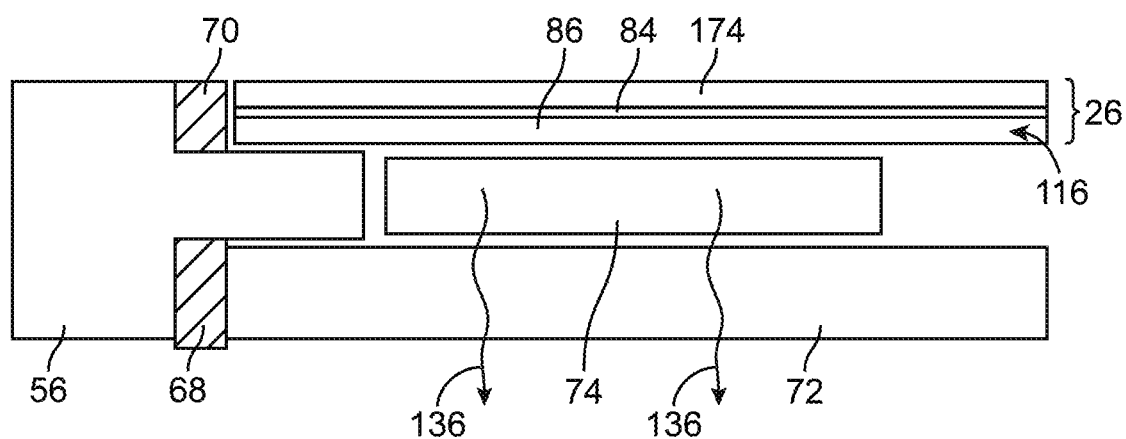
FIG. 19 is a cross-sectional side view of an illustrative display module having front and rear plate structures in which the rear plate structure includes a light guide layer in accordance with an embodiment of the present invention.

FIG. 19 shows how light guide plate 86 may be laminated to reflector 84 and rear plate layer 174 to form rear plate 26. Rear plate layer 174 may be formed from glass, glass coated with a pattered opaque inner masking layer, ceramic, metal, composites, plastic, or other materials. Reflector 84 may be formed from white plastic, white polyester, or other reflective materials that create diffuse reflected light. Light guide plate 86 may be formed from plastic, glass, or other materials into which light 116 is launched from a light source such as light-emitting diodes. Light that is reflected from reflector 84 and that is scattered from within light guide 86 serves as backlight 136 that passes through internal display structures 74 and display structures 72. Layers such as layers 86, 84, and 174 may be laminated using layers of adhesive, application of heat and pressure, or other lamination techniques.

Figure 20:
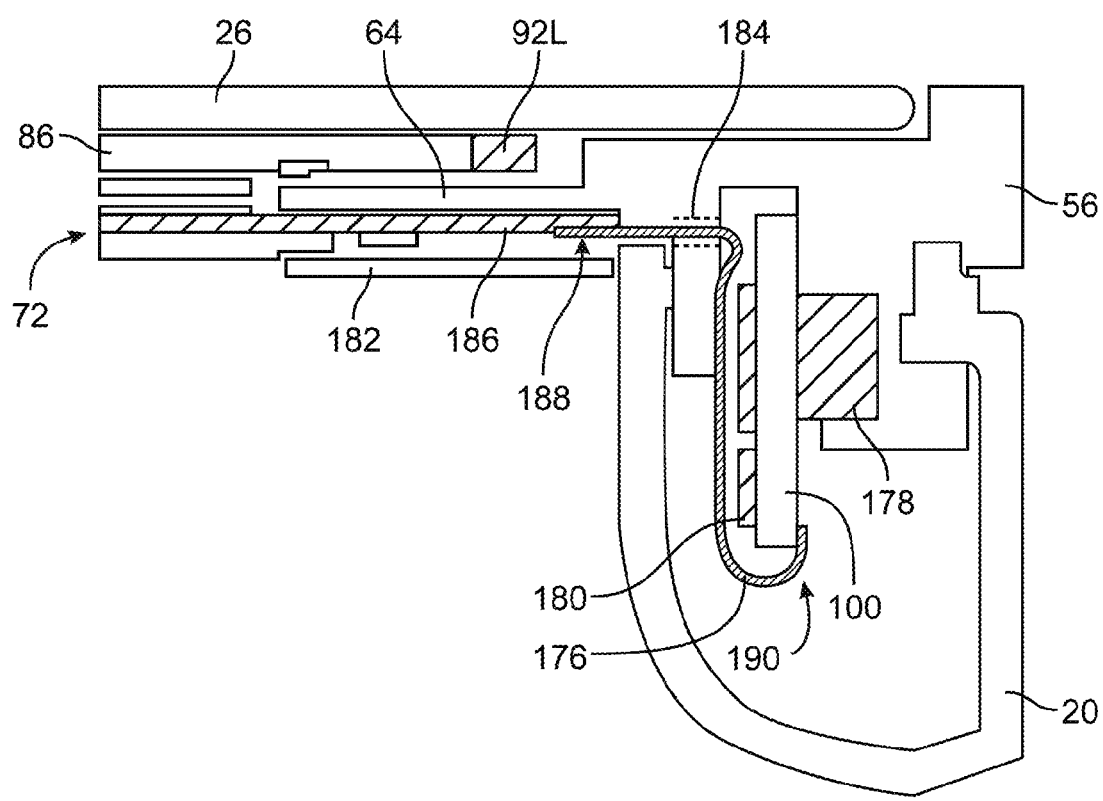
FIG. 20 is a cross-sectional end view of an illustrative clutch barrel structure in which a display driver board is mounted in accordance with an embodiment of the present invention.

FIG. 20 shows how display timing and control chip 180 may be mounted on driver board 100 (e.g., a printed circuit board) within clutch barrel 20. Clutch barrel 20 may be formed from metal, plastic, or other materials and may be used to enclose hinges 58, mating hinge structures 104, driver board 100, and other components. A screw such as screw 178 may be used to mount driver board 100 to housing member 56. A bus such as a bus formed from a flex circuit such as flex circuit 176 may be used to route signals between circuit 180 and thin-film transistors on thin-film transistor layer 186 or other image pixel array in display structures 72. Flex circuit 176 may be routed between board 100 and layer 186 through an opening in housing member 56 such as opening 184. Flex circuit 176 may be attached to thin-film transistor layer 186 at attachment location 188 and to traces on board 100 at location 190 using conductive adhesive, solder joints, connectors, or other conductive attachment mechanisms.

Light-emitting diodes such as diode 92L may be used to launch light into light guide 86 that provides backlight for display structures 72. A cosmetic trim or gasket structure such as structure 182 (e.g., bezel 42 of FIG. 3) may surround the edge of display 18 (FIG. 1A). Trim 182 may be formed from metal, glass, plastic, fiber composite material, etc.

Figure 21:
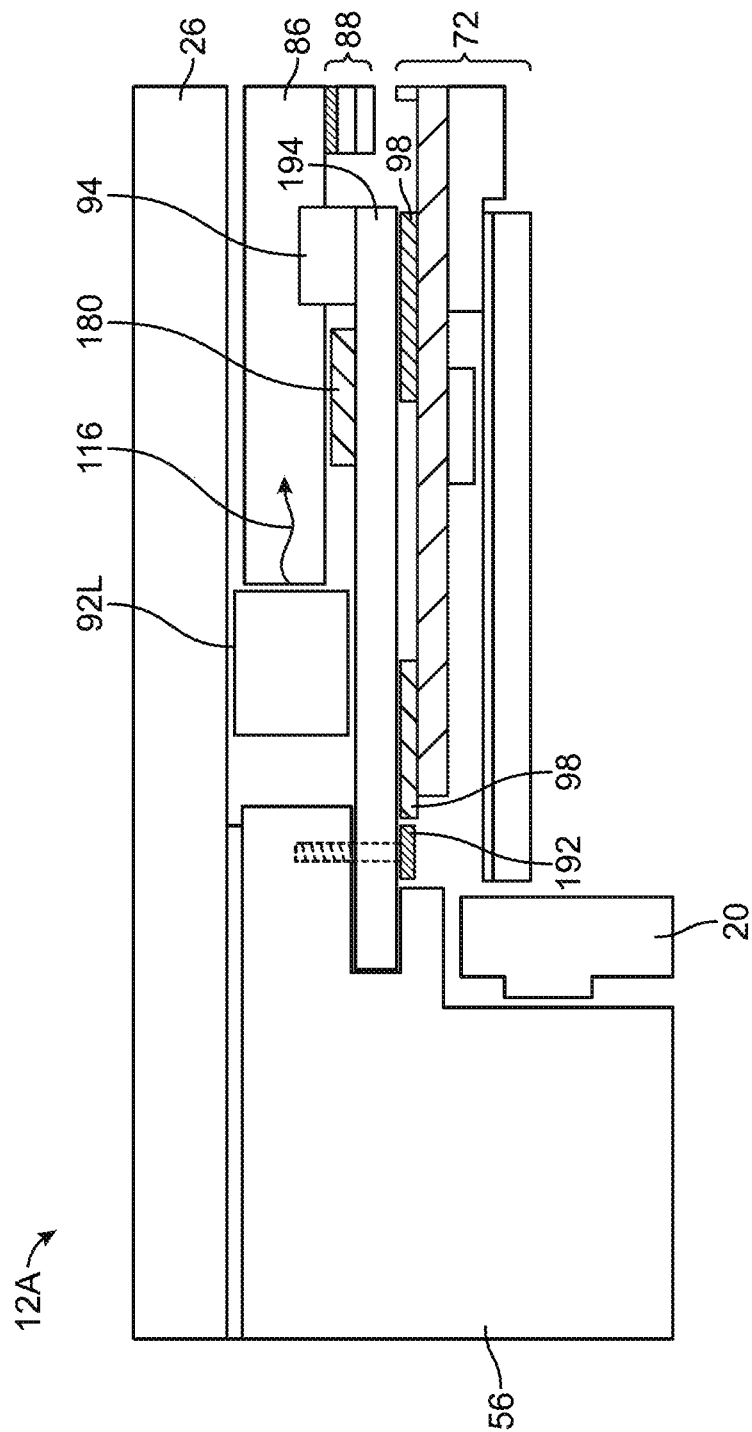
FIG. 21 is a cross-sectional side view of a portion of a display module showing how light source components such as light-emitting diodes may be mounted on a driver board substrate that is interposed between front-side display structures such as liquid crystal display structures and a rear plate structure in accordance with an embodiment of the present invention.

FIG. 21 is a cross-sectional side view of display module 12A showing how display timing controller integrated circuit 180 may be mounted on a substrate such as substrate 194 that is separate from housing member 56. Substrate 194 may be a ceramic substrate, a printed circuit board substrate such as a rigid printed circuit board substrate, a substrate formed from another dielectric layer, etc. Substrate 194 may form a housing shelf that is secured to housing member 56 using adhesive or a fastening mechanism such as screw 192. Light-emitting diodes such as diode 92L may be mounted on substrate 194 and may be used to launch backlight 116 into light guide 86 along one or more edges of display 18. Timing and control chip 180 and other driver board circuitry may also be attached to substrate 194.

Figure 22:
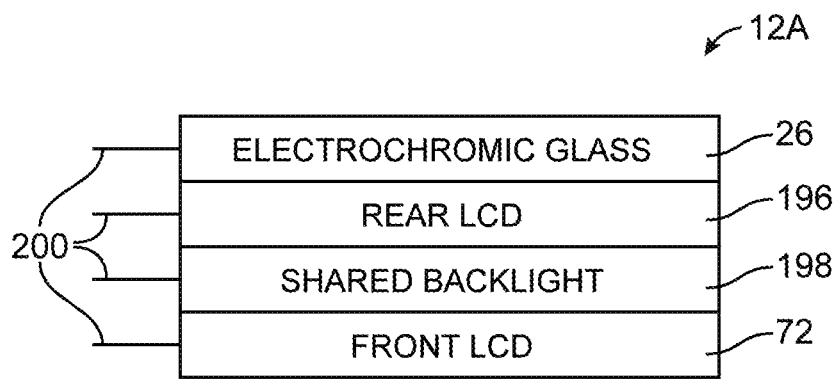
FIG. 22 is a side view of an illustrative display module having an electrochromic glass structure, a front display structure, a rear display structure, and a shared backlight in accordance with an embodiment of the present invention.

Electrochromic glass may be used to form rear plate 26, as shown in the cross-sectional view of display module 12A of FIG. 22. Electrochromic glass, which is sometimes referred to as electrically switchable glass, may receive control signals (e.g., voltage control signals) from control circuitry 36 (FIG. 2). The control signals can be used to place electrochromic glass 26 in either a transparent (light-passing) state or a translucent (light-blocking) state. In the light-blocking state, the interior of display module 12A will be substantially hidden from view and the exterior surface of rear plate 26 will appear opaque or translucent. In the light-passing state, layer 26 may be sufficiently clear to allow a user to view an image or other light output from status light-emitting diodes or other light sources.

As shown in the example of FIG. 22, a rear-facing display such as a display formed from liquid-crystal display structures 196 may be formed under electrochromic glass layer 26 or in place of electrochromic glass layer 26. Shared backlight 198 may serve as a backlight for both rear display structures 196 and front display structures 72. For example, backlight 198 may include a light guide layer (see, e.g., plate 86 of FIG. 5) and associated optical films (e.g., a rear polarizer, diffuser, etc.), but no reflectors. In this type of arrangement, light that is launched into the light guide layer will be scattered in the rear direction to serve as backlight for rear-facing display 196 and will be scattered in the front direction to serve as backlight for front-facing display 72 (i.e., display 18). Display structures 72 and 196 may include optional cover glass layers (e.g., on the front-facing display only, on the rear-facing display only, or on both the front-facing display structures and the rear-facing display structures), color filter layers, thin-film transistor layers, polarizer layers and other optical films, etc. If desired, electrochromic glass 26 may be omitted (e.g., to form a two-sided display without electrochromic properties). In arrangements such as these, optical films will be interposed between shared backlight 198 and the front and rear surfaces of housing 12A. For example, optical film layers (e.g., polarizer layers, diffuser layers, and other optical films associated with display structures 196) will be interposed between the backlight layer of backlight unit 198 and the color filter layer and thin-film transistor layer of display structures 196. Optical films such as these will also be interposed between the backlight layer of backlight 198 and the color filter layer and thin-film transistor layer of display structures 72.

In configuration in which electrochromic glass is used, a user can view images that are presented on rear display 196 when the electrochromic glass is in its clear state. Control circuitry 36 can use paths 200 to provide signals such as control and data signals to glass 26 (e.g., to change the state of glass 26), to displays 196 and 72 (e.g., to direct displays 196 and 72 to display particular images), and to shared backlight 198 (to adjust the brightness of the light-emitting diodes associated with the backlight). Two-display housing configurations of the type shown in FIG. 22 may, if desired, have individual backlight units. The use of a single common backlight for illuminating both front and rear displays may, however, help reduce display thickness and reduce complexity. Displays 196 and 72 may, if desired, be touch screen displays (e.g., by incorporating arrays of touch screen electrodes such as transparent indium tin oxide capacitive electrodes for a capacitive touch screen).

Figure 23:
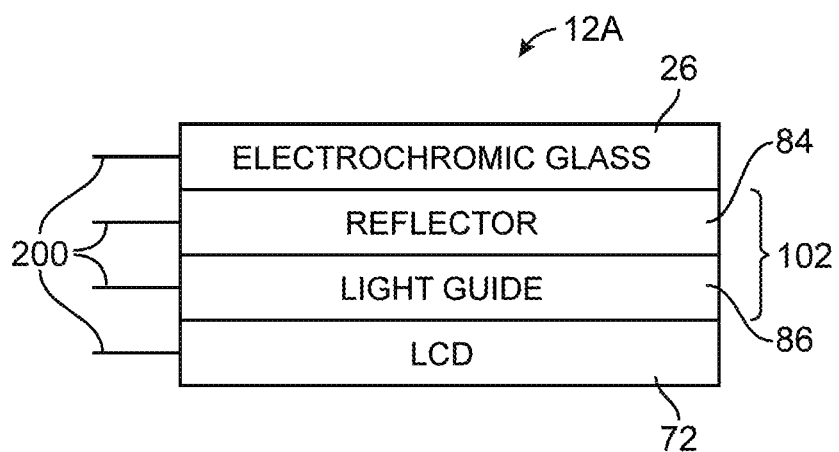
FIG. 23 is a side view of an illustrative display module having an electrochromic glass layer, a reflector, a backlight, and a front-side liquid crystal display structure in accordance with an embodiment of the present invention.

FIG. 23 is a cross-sectional diagram of an illustrative configuration for display module 12A in which display module 12A has a single display (i.e., liquid crystal display structures 72, which may or may not be touch sensitive). In this type of configuration, backlight for display structures 72 may be provided by backlight unit 102. Back light may be delivered using light guide 86. Reflector 84 may direct light that is emitted from the rear surface of light guide 86 back through display 72. Some light may pass through reflector 84. When electrochromic glass layer 26 is in its light-blocking state, the rear of display module 26 may appear dark. When electrochromic glass layer 26 is in its light-transmitting state, the light that passes through reflector 84 towards the rear of display module 12A may pass unimpeded through electrochromic layer 26. By adjusting the state of electrochromic glass layer 26, device 10 can adjust the appearance of the rear surface of display housing 12A (and, if desired, the rear surface of housing 12B, which may also be provided with single-display and dual-display configurations of the types shown in FIGS. 22 and 23).

Electrochromic layers such as layers 26 of FIGS. 22 and 23 may extend over the entirety of the rear surfaces of housings 12A and 12B or, if desired, may be controlled in a more granular fashion. For example, device 10 may be provided with an electrochromic layer that is divided into multiple sections (e.g., halves, quarters, eighths, or other subsections of a full rear surface). This type of arrangement may be used when it is desired to control different areas of housing 12A (or 12B) individually (e.g., when it is desired to adjust illumination levels individually or when it is desired to make localized adjustments to form patterns such as logo 82). Patterned masking layers may be used to coat the inner surface of electrochromic glass layer 26 if desired.

Figure 24:
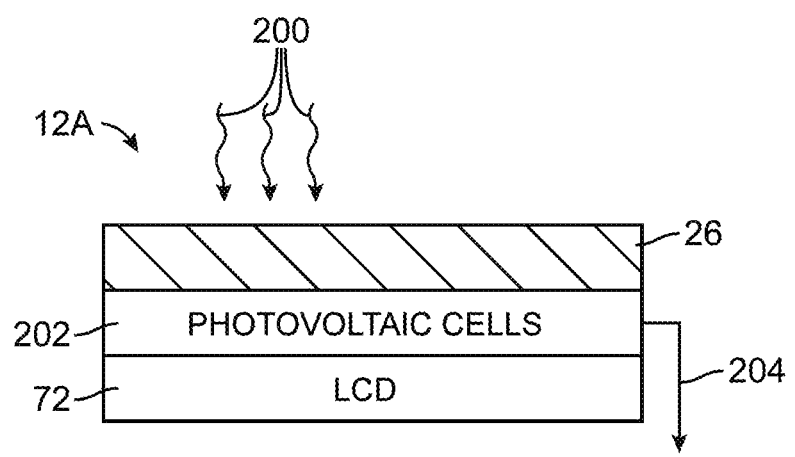
FIG. 24 is a cross-sectional side view of an illustrative display module with photovoltaic cell structures that receive light through a rear plate in accordance with an embodiment of the present invention.

As shown in FIG. 24, photovoltaic structures (sometimes referred to as solar cells or photovoltaic cells) may be placed under a glass layer or other rear plate 26. For example, photovoltaic cells 202 may be interposed between a glass layer (rear plate) 26 and liquid crystal display structures 72 for display 18 (FIG. 1A). When device 10 is near a source of external illumination, such as light rays 200, light rays 200 may pass through the glass or other transparent layer that forms rear plate 26. Photovoltaic cells 202 may receive the light rays that pass through layer 26 and may convert this light into electrical power (e.g., 10 mW or more, 100 mW, 1 W or more, etc.) on path 204. Path 204 may supply power from cells 202 to power circuits 32 (FIG. 2) to power device 10 and/or to charge battery 34. By charging battery 34 with battery charging power from path 204, battery charge can be extended.

Figure 25:
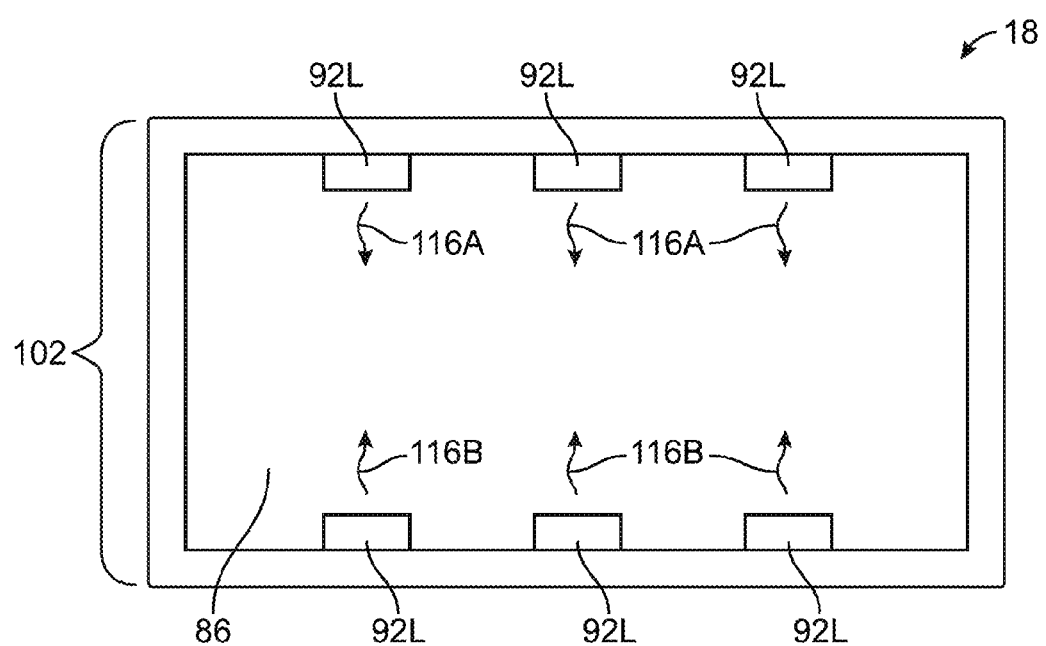
FIG. 25 is a top view of an illustrative light-emitting diode layout that may include opposing rows of light-emitting diodes for illuminating a display such as a liquid crystal display in accordance with an embodiment of the present invention.

To ensure that display 18 is evenly illuminated, the back light unit that provides backlight for display 18 of FIG. 1A may be provided with light-emitting diodes that are arranged along more than one of the edges of the light guide layer in the back light unit. A top view of an illustrative layout that may be used for light-emitting diodes 92L in backlight unit 102 of display 18 is shown in FIG. 25. Display 18 is rectangular and has left, right, top, and bottom edges. Arrays of light-emitting diodes for backlight unit 102 may be provided along one edge of display 18, along two edges of display 18, along three edges of display 18, or along four edges of display 18.

In the example of FIG. 25, backlight unit 102 of display 18 includes two rows of light-emitting diodes 92L. Light-emitting diodes 92L along the upper edge of display 18 launch backlight 116A into light guide 86. Light-emitting diodes 92L along the lower edge of display 18 launch backlight 116B into light guide 86. In the FIG. 25 example, only three light-emitting diodes are shown in each row to avoid over-complicating the drawing. In a typical display, there may be numerous light-emitting diodes (e.g., five or more, ten or more, twenty or more, etc.). The use of light-emitting diodes that are arranged along more than one of the edges of display 18 may help create more backlight and/or more evenly distributed backlight than arrangements in which only one edge of light guide 86 is provided with light-emitting diodes. Dividing light production between multiple sets of LEDs allows each LED set to be driven less aggressively, reducing deterioration (from heat, etc.) thereby improving LED life. This also permits smaller and thinner LEDs to be used, while maintaining performance of a single, larger set of LEDs.

Figure 26:
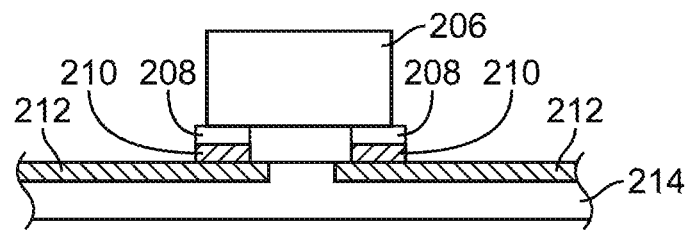
FIG. 26 is a cross-sectional side view of a conventional configuration for mounting light-emitting diodes on a printed circuit board substrate.

In conventional backlight units, light-emitting diodes are soldered to the top of a flex circuit. This type of arrangement is shown in FIG. 26. As shown in FIG. 26, light-emitting diode 206 has terminals 208 that are soldered to traces 212 on flex circuit 214 using solder 210. Light-emitting diode 206 rests on the upper surface of flex circuit 214, so the total thickness of the FIG. 26 assembly is equal to the sum of the flex circuit, light-emitting diode, solder pad, and terminal thicknesses. The thickness of conventional arrangements of the type shown in FIG. 26 may not be acceptable in devices where space is at a premium.

Figure 27:
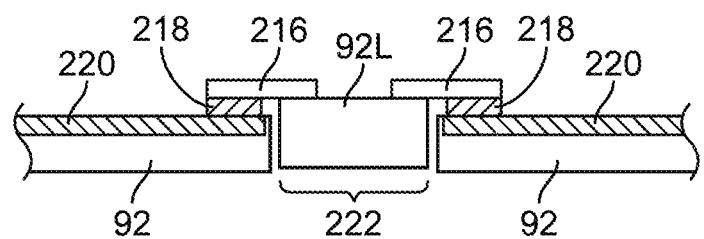
FIG. 27 is a cross-sectional side view of an illustrative configuration for mounting light-emitting diodes to a printed circuit board substrate in accordance with an embodiment of the present invention.

To help minimize size in device 10, light-emitting diodes 92L may, if desired, be mounted upside down as shown in FIG. 27. With this type of configuration, substrate 92 may have openings such as opening 222 each of which receives a respective light-emitting diode 92L. As shown in FIG. 27, conductive traces such as traces 220 may be formed on the surface of substrate 92. Substrate 92 may be, for example, a ceramic substrate, a rigid printed circuit board substrate, or a flex circuit substrate. When light-emitting diode 92L is inserted upside down so that the top of light-emitting diode 92L rests within opening 222 of substrate 92, terminals 216 of light-emitting diode 92L may be connected to traces 220 using solder 218, conductive adhesive, or other suitable electrically conducting materials. The total height of a light-emitting diode backlight assembly constructed in accordance with the arrangement of FIG. 27 may be thinner than conventional arrangements of the type shown in FIG. 26, even if the thickness of substrate 92 is somewhat larger than conventional flex circuit substrates.

Figure 28:
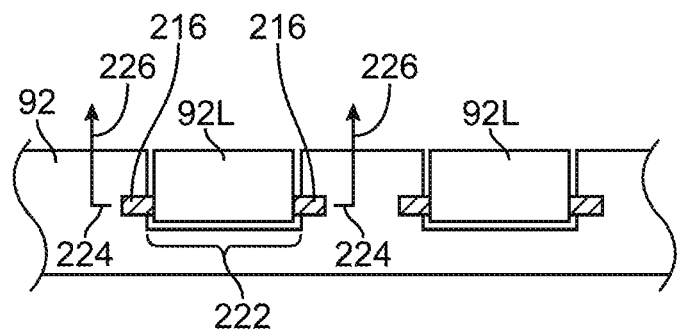
FIG. 28 is a top view of an illustrative set of light-emitting diodes mounted to a printed circuit board substrate using an upside down orientation of the type shown in FIG. 27 in accordance with an embodiment of the present invention.

Openings 222 may have any suitable shape. An illustrative arrangement in which openings 222 are formed from open-sided rectangles (notches) formed along one edge of substrate 92 is shown in the top view of FIG. 28. Two light-emitting diodes 92L are shown in the FIG. 28 example, but in a typical light-emitting diode array for edge illuminating a back light unit, there may be five or more, ten or more, or twenty or more light-emitting diodes. The cross-sectional side view of FIG. 27 corresponds to a cross-section taken along line 224 of FIG. 28 viewed in direction 226.

Figure 29:
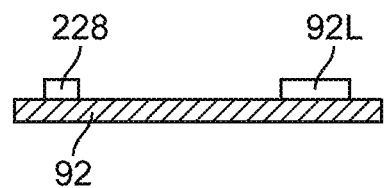
FIG. 29 is a side view of an illustrative substrate on which a light-emitting diode or other light source for illuminating a display has been mounted in accordance with an embodiment of the present invention.
Figure 30:
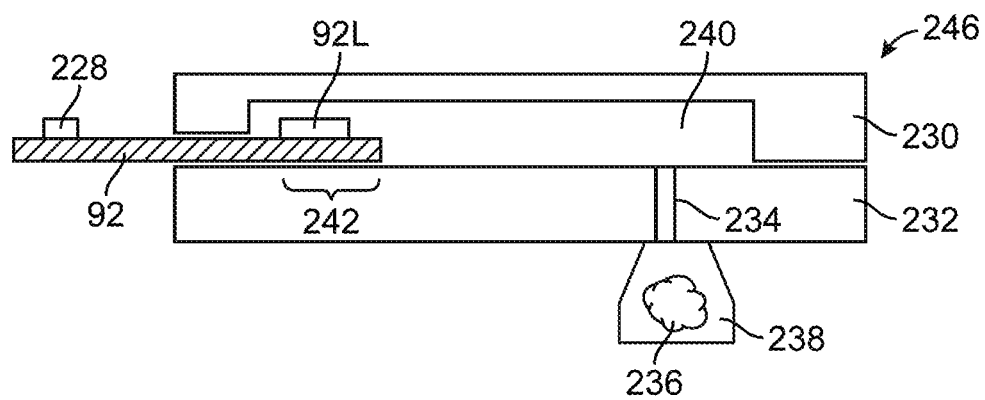
FIG. 30 is a cross-sectional side view of a substrate of the type shown in FIG. 29 that has been placed into an insert-molding tool cavity in accordance with an embodiment of the present invention.
Figure 31:
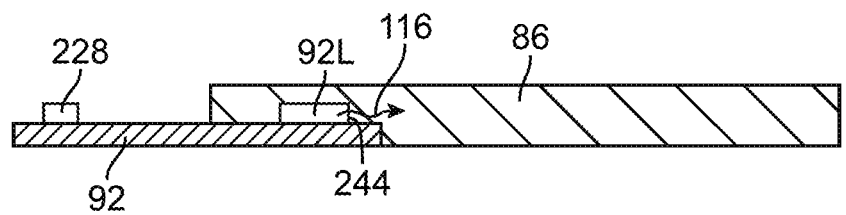
FIG. 31 is a cross-sectional side view of an illustrative substrate of the type shown in FIG. 29 following the insert molding of an encompassing layer of light-guide panel material over the light-emitting diode in accordance with an embodiment of the present invention.

To minimize light scattering and thereby enhance the efficiency with which light enters light guide 86 from light-emitting diodes 92L in backlight unit 102, light guide 86 may be formed using an insert molding process. An illustrative insert molding process that may be used to construct backlight unit 102 in device 10 is shown in FIGS. 29, 30, and 31. Initially, light-emitting diodes such as light-emitting diode 92L may be mounted to a flex circuit or other substrate such as substrate 92 of FIG. 29. Traces on substrate 92 such as traces 220 of FIG. 27 may be used to electrically connect the terminals of light-emitting diode 92L to terminals 228 (e.g., metal pads or a circuit board connector). Light-emitting diodes 92L may be soldered to substrate 92 or may be mounted to substrate 92 using conductive adhesive.

After light-emitting diodes 92L have been mounted to substrate 92, portion 242 of substrate 92 and light-emitting diodes 92L may be inserted into the cavity of an insert molding tool, as shown in FIG. 30. Insert molding tool 246 may include mold portions such as upper mold portion 230 and lower mold portion 232. Portion 242 may extend into cavity 240, so that portion 242 and light-emitting diode 92L may be covered with insert-molded material during insert molding operations. Insert molding material 236 may be formed from plastic or other suitable materials and may be inserted into cavity 240 through opening 234 in mold 232 from reservoir 238. During molding operations, tool 246 may apply heat and pressure that molds material 236 over light-emitting diode 92L and the exposed end of substrate 92 in cavity 240.

Following the insert molding process and removal of the substrate 92 from tool 246, light-emitting diodes 92L are covered with material 236. Cavity 240 can be configured so that the resulting shape of material 236 forms light guide 86, as shown in FIG. 31. In light guide 86 of FIG. 31, light-emitting edge 244 of light-emitting diode 92L is covered with a conformal layer of clear plastic (or other light guide material), so there are minimal coupling losses as light 116 exits light-emitting diode 92L and enters planar light guide member 86.

Figure 32:
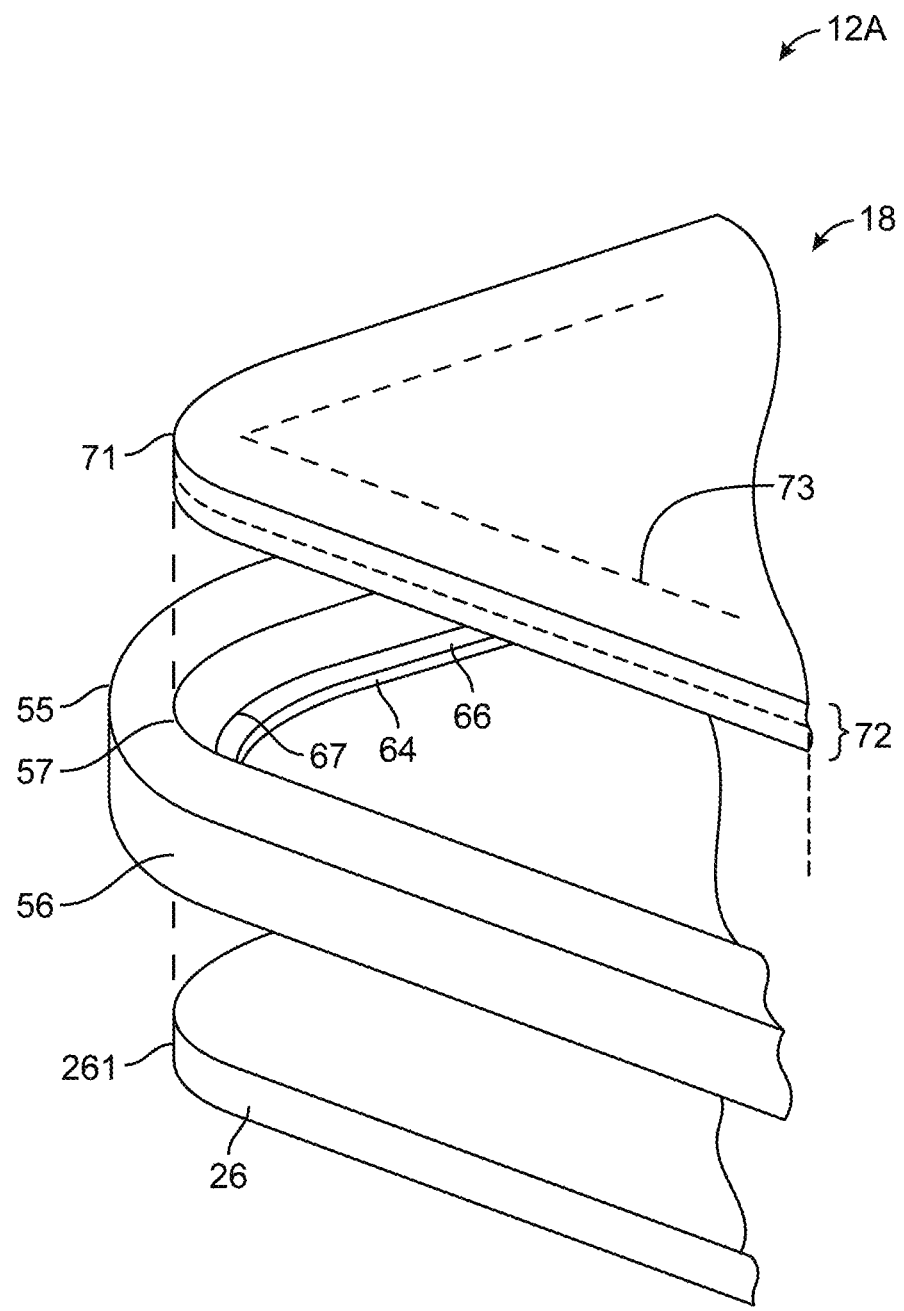
FIG. 32 is an exploded perspective view of a portion of an electronic device having rounded display and housing corners in accordance with an embodiment of the present invention.

As shown in the exploded perspective view of housing 12A in FIG. 32, display 18 and housing 12A may have rounded corners. In particular, display structures 72 (e.g., an upper layer formed from a polarizer, color filter array layer, etc. and a lower layer formed from a thin-film transistor layer, or other suitable layers) may have one, two, three, or four curved corners such as curved corner 71. Member 56 may have one, two, three, or four curved corners such as curved corner 55. Shelf 64 of member 56 may have a one, two, three, or four curved corners such as curved corner 67 (e.g., that mate with curved corner 71 and that have a radius of curvature that is proportional to the radius of curvature of corner 71). Other structures within display 12A may, if desired, be curved to accommodate the curved interior shape of member 56. Rear plate 26 may likewise have one, two, three, or four curved corners such as corner 261 (e.g., that mate with the curved interior surface of member 56).

Figure 33:
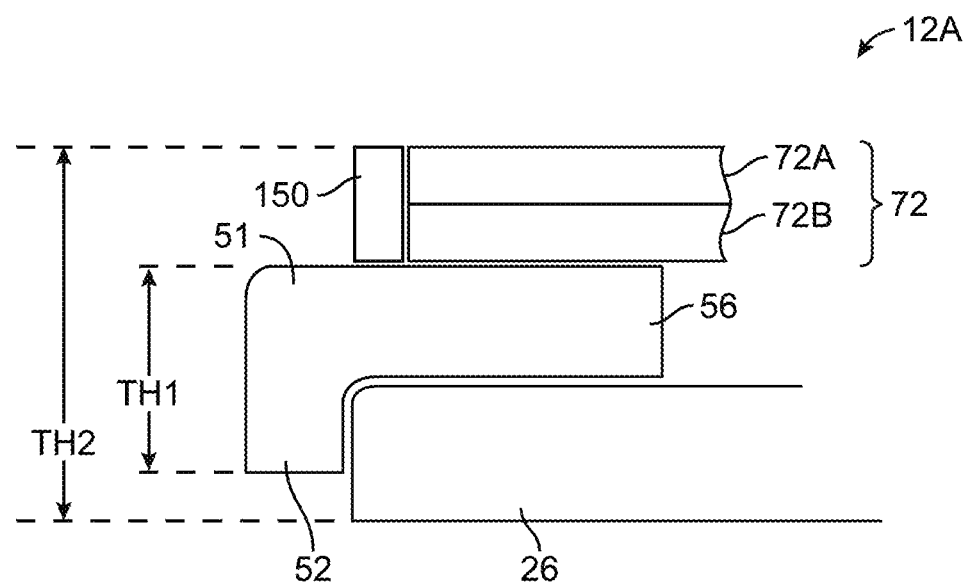
FIG. 33 is a cross-sectional side view of a portion of a housing for an electronic device showing how display structures may be surrounded by a trim member and showing how the display frame may be thinner than the overall thickness of the device housing and mounted components in accordance with an embodiment of the present invention.

FIG. 33 is a cross-sectional side view of a portion of a housing for an electronic device (e.g., upper housing 12A) showing how the peripheral edge of display structures 72 may be surrounded by a peripheral trim member such as trim member 150. Trim member 150 may be formed from plastic, glass, ceramic, fiber composite materials, metal, or other materials. Display structures 72 may include color filter layer 72A (or a polarizer on a color filter layer) and thin-film transistor layer 72B. A cover glass layer and other display layers may also be incorporated into display structures 72 if desired. Display structures 72 may be mounted on the front of peripheral housing member 56 and rear plate 26 may be mounted on the rear of peripheral housing member 56 (as an example). With a configuration of the type shown in FIG. 33, the exterior surface of display structures 72 extends beyond surface S1 of member 56 and the exterior surface of rear plate 26 extends beyond surface S2 of member 56, so that apparent thickness TH1 of housing 12A is thinner than actual thickness TH2 of housing 12A.

The foregoing is merely illustrative of the principles of this invention and various modifications can be made by those skilled in the art without departing from the scope and spirit of the invention.

What is claimed is:

1. A portable computer, comprising:
   upper and lower housings, wherein the upper housing has a front surface and a rear surface;
   a hinge connecting the upper and lower housings;
   a display mounted that forms a portion of the front surface of the upper housing, wherein the display has four edges;
   a peripheral housing member that surrounds the four edges of the display; and
   a rectangular plate that is mounted within the peripheral housing member, wherein the rectangular plate at least partially forms the rear surface of the upper housing.

2. The portable computer defined in claim 1 wherein the peripheral housing member comprises metal.

3. The portable computer defined in claim 2 wherein the rectangular plate comprises a material selected from the group consisting of: metal, glass, ceramic, fiber composite, and plastic.

4. The portable computer defined in claim 2 wherein the rectangular plate comprises glass.

5. The portable computer defined in claim 1 wherein the peripheral housing member comprises fiber composite material.

6. The portable computer defined in claim 5 wherein the peripheral housing member comprises an opening in which an antenna is formed.

7. The portable computer defined in claim 1 wherein the peripheral housing member comprises an integral shelf structure, wherein the display comprises at least one planar member that is mounted to a first side of the integral shelf structure, and wherein the rectangular plate is mounted to a second side of the integral shelf structure.

8. The portable computer defined in claim 7 further comprising:
   a clutch barrel that covers the hinge; and
   a display driver board mounted within the clutch barrel.

9. The portable computer defined in claim 1 wherein the peripheral housing member comprises an integral shelf structure, the portable computer further comprising at least one light-emitting diode mounted on the integral shelf structure.

10. The portable computer defined in claim 1 further comprising a shelf structure that is attached to the peripheral housing member, wherein the rectangular plate is mounted to the peripheral housing member.

11. The portable computer defined in claim 10 further comprising at least one light-emitting diode mounted on the shelf structure.

12. The portable computer defined in claim 1 wherein the display comprises a touch screen having a touch sensor array.

13. The portable computer defined in claim 1 wherein the display has at least one curved corner.

14. The portable computer defined in claim 13 wherein the peripheral housing member has at least one curved corner.

15. The portable computer defined in claim 1 wherein the rectangular plate has at least one curved corner.

16. The portable computer defined in claim 1 further comprising antenna traces on the rectangular plate.

17. The portable computer defined in claim 1 further comprising a camera that receives light through the rectangular plate.

* * * * *